(12) United States Patent
Alkove et al.

(10) Patent No.: US 7,664,966 B2
(45) Date of Patent: Feb. 16, 2010

(54) SECURE STORAGE ON RECORDABLE MEDIUM IN A CONTENT PROTECTION SYSTEM

(75) Inventors: James M. Alkove, Woodinville, WA (US); Henry Paul Gabryjelski, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 10/847,516

(22) Filed: May 17, 2004

(65) Prior Publication Data

US 2005/0257074 A1    Nov. 17, 2005

(51) Int. Cl.
*G06F 21/00* (2006.01)
*G06F 21/24* (2006.01)
*G06F 21/02* (2006.01)

(52) U.S. Cl. .................. 713/193; 713/189; 726/16; 726/27; 726/30; 711/163; 711/164

(58) Field of Classification Search ............. None
See application file for complete search history.

(56) References Cited

U.S. PATENT DOCUMENTS

| | | | |
|---|---|---|---|
| 5,513,260 A | 4/1996 | Ryan | 380/3 |
| 5,715,403 A | 2/1998 | Stefik | 395/244 |
| 6,493,825 B1* | 12/2002 | Blumenau et al. | 713/168 |
| 7,076,432 B1* | 7/2006 | Cheah et al. | 704/500 |
| 7,103,574 B1* | 9/2006 | Peinado et al. | 705/51 |
| 7,281,273 B2* | 10/2007 | Strom et al. | 726/27 |
| 7,328,344 B2* | 2/2008 | Chang | 713/175 |
| 7,392,541 B2* | 6/2008 | Largman et al. | 726/17 |
| 7,392,547 B2* | 6/2008 | Cahill et al. | 726/27 |
| 2001/0029579 A1* | 10/2001 | Kusakabe et al. | 713/172 |
| 2001/0040966 A1* | 11/2001 | Buhr et al. | 380/277 |
| 2002/0016919 A1* | 2/2002 | Sims, III | 713/193 |

(Continued)

FOREIGN PATENT DOCUMENTS

EP    0 878 796 A2    11/1998

(Continued)

OTHER PUBLICATIONS

Chen, Y-C. et al., "An Efficient Nonce-Based Authentication Scheme with Key Agreement", *Applied Mathematics and Computation*, 2005, 169, 982-994, XP 005098050.

(Continued)

*Primary Examiner*—Syed A. Zia
(74) *Attorney, Agent, or Firm*—Woodcock Washburn LLP

(57) ABSTRACT

An application on a computing device to write data to a storage medium associated therewith. The data is to be written to a secure storage area associated with an object on the storage medium, and the secure storage area has a value storage area associated therewith. The application generates a nonce and employs a shared session key (KS) to encrypt the nonce to result in (KS(nonce)). The storage medium receives same and decrypts with (KS) to result in the nonce, locates the value storage area associated with the secure storage area, and stores such nonce in the located value storage area. The application employs the nonce to generate a key (KH), encrypts the data with (KH) to result in (KH(data)), and sends same to the storage medium for storage in the secure storage area. Thus, (KH(data)) is associated with the nonce in the value storage area.

112 Claims, 8 Drawing Sheets

U.S. PATENT DOCUMENTS

| | | | |
|---|---|---|---|
| 2004/0049513 A1* | 3/2004 | Yakir et al. | 707/100 |
| 2004/0117309 A1* | 6/2004 | Inoue et al. | 705/50 |
| 2004/0153457 A1* | 8/2004 | Fischer et al. | 707/10 |
| 2005/0100168 A1* | 5/2005 | Ayatsuka | 380/278 |
| 2005/0108556 A1* | 5/2005 | DeMello et al. | 713/189 |
| 2005/0125681 A1* | 6/2005 | Bressy et al. | 713/189 |
| 2005/0154906 A1* | 7/2005 | Kriech et al. | 713/193 |
| 2006/0059375 A1* | 3/2006 | Ooshima et al. | 713/193 |
| 2006/0123483 A1* | 6/2006 | Cohen | 726/26 |
| 2007/0143632 A1* | 6/2007 | Matsuzaki et al. | 713/193 |
| 2009/0013190 A1* | 1/2009 | Benhammou et al. | 713/185 |

FOREIGN PATENT DOCUMENTS

| | | |
|---|---|---|
| EP | 1 376 308 A2 | 1/2004 |
| WO | WO 00/58811 | 10/2000 |
| WO | WO 00/59150 | 10/2000 |
| WO | WO 01/52021 A1 | 7/2001 |
| WO | WO 01/78075 A1 | 10/2001 |
| WO | WO 02/01335 A2 | 1/2002 |
| WO | WO 03/007158 A1 | 1/2003 |

OTHER PUBLICATIONS

Hong, S. et al., "On the construction of a powerful distributed authentication server without additional key management", *Computer Communications*, 2000, 23, 1638-1644.

Managing Digital Rights in Online Publishing, "How two publishing houses maintain control of copyright" *Information Management & Technology*, 2001, 34(4), 168-169.

Jakobsson, M. et al., "Proprietary Certificates", *Topics in Cryptology*, 2002, 164-181.

Kumik, P. "Digital Rights Management", *Computers and Law*, 2000, 11(4), 14-15.

Torrubia, A. et al., "Cryptography regulations for E-commerce and digital rights management", *Computers & Security*, 2001, 20(8), 724-738.

Zwollo, K. "Digital document delivery and digital rights management",*Information Services & Use*, 2001, 9-11.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11), 27.

Gunter, C.A., et al. "Models and Languages for Digital Rights", *Proceedings of the 34$^{th}$ Annual Hawaii International Conference on System Sciences*, 2001, 1-5.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4$^{th}$ International Workshop on Networked Appliances*, 2002, 49-56.

Hwang, C. et al., "Protection of Digital Contents on Distributed Multimedia Environment", *Proceedings of the IASTED International Conference, Internet and Multimedia Systems and Applications*, Nov. 19-23, 2000, Las Vegas, Nevada, USA, pp. 127-132.

Trampus, M. et al., "Using Smart Cards as a Secure Storage for Digitally Signed Documents", *IEEE Region 8 EUROCON 2003. Computer as a Tool. Proceedings*, 2003, 2, 74-78.

Ujvari, T. et al., "A Secure Data Storage System Based on Phase-Encoded Thin Polarization Holograms", *Journal of Optics A-Pure and Applied Optics*, 2004, 6(4), 401-411.

Wright, T., "Secure Digital Archiving of High-Value Data", *BT Technology Journal*, 2001, 19(3), 60-66.

\* cited by examiner

SECURE STORAGE ON RECORDABLE MEDIUM IN A CONTENT PROTECTION SYSTEM

TECHNICAL FIELD

The present invention relates to an architecture and method for allowing data to be securely stored on a recordable medium in a content protection system. More particularly, the present invention relates to such an architecture and method whereby the medium is associated with a computing device and an application operating on the computing device and the medium cooperate to securely store and retrieve the data.

BACKGROUND OF THE INVENTION

As is known, and referring now to FIG. 1, a content protection and rights management (CPM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14, a portable playback device or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A CPM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based CPM system 10 allows an owner of digital content 12 to specify rules that must be satisfied before such digital content 12 is allowed to be rendered. Such rules can include the aforementioned requirements and/or others, and may be embodied within a digital license 16 that the user/user's computing device 14 (hereinafter, such terms are interchangeable unless circumstances require otherwise) must obtain from the content owner or an agent thereof, or such rules may already be attached to the content 12. Such license 16 may for example include the decryption key (KD) for decrypting the digital content 12, perhaps encrypted according to another key decryptable by the user's computing device or other playback device.

The content owner for a piece of digital content 12 would prefer not to distribute the content 12 to the user unless such owner can trust that the user will abide by the rules specified by such content owner in the license 16 or elsewhere. Preferably, then, the user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the CPM system 10 to carry out the wishes of the owner of the digital content 12 according to the rules, and the user should not be able to easily alter such trusted component 18 and/or the evaluator 20 for any purpose, nefarious or otherwise.

As should be understood, the rules for rendering the content 12 can specify whether the user has rights to so render based on any of several factors, including who the user is, where the user is located, what type of computing device 14 or other playback device the user is using, what rendering application is calling the CPM system 10, the date, the time, etc. In addition, the rules may limit rendering to a pre-determined number of plays, or pre-determined play time, for example.

The rules may be specified according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the evaluator 20 determining that the user satisfies the rules, the digital content 12 can then be rendered. In particular, to render the content 12, the decryption key (KD) is obtained from a pre-defined source and is applied to (KD (CONTENT)) from the content package 13 to result in the actual content 12, and the actual content 12 is then in fact rendered.

Note that the trusted component 18 may at times be required to maintain state information relevant to the rendering of a particular piece of content 12 and/or the use of a particular license 16. For example, it may be the case that a particular license 16 has a play count requirement, and accordingly the trusted component 18 must remember how many times the license 16 has been employed to render corresponding content 12 or how many more times the license 16 may be employed to render the corresponding content 12. Accordingly, the trusted component 18 may also include at least one persistent secure store 22 within which such state information is persistently maintained in a secure manner. Thus, the trusted component 18 stores such state information in such secure store 22 in a persistent manner so that such state information is maintained even across sessions of use on the computing device 14. Such secure store 22 may be likely located on the computing device 14 of the trusted component 18, although as will be seen it may also be useful or even necessary to locate such secure store 22 elsewhere.

In a CPM system 10, content 12 is packaged for use by a user by encrypting such content 12 and associating a set of rules with the content 12, whereby the content 12 can be rendered only in accordance with the rules. Because the content 12 can only be rendered in accordance with the rules, then, the content 12 may be freely distributed. Typically, the content 12 is encrypted according to a symmetric key such as the aforementioned key (KD) to result in (KD(content)), and (KD(content)) therefore is also decrypted according to (KD) to result in the content 12. Such (KD) may in turn be included within the license 16 corresponding to the content 12.

Oftentimes, such (KD) is encrypted according to a public key such as the public key of the computing device 14 (PU-C) upon which the content 12 is to be rendered, resulting in (PU-C(KD)). Note, though, that other public keys may be employed, such as for example a public key of a user, a public key of a group of which the user is a member, etc., and that other schemes such as broadcast encryption may be employed to hide (KD). Thus, and presuming the public key is (PU-C), the license 16 with (PU-C(KD)) is tied to and may only be used in connection with such computing device 14 inasmuch as only such computing device 14 should have access to the private key (PR-C) corresponding to (PU-C). As should be appreciated, such (PR-C) is necessary to decrypt (PU-C(KD)) to obtain (KD), and should be closely held by such computing device 14.

As was alluded to above, it may be the case that state information for all content 12 and/or licenses 16 associated with a computing device 14 are stored in a centrally located secure store 22 associated with the trusted component 18 of the computing device. However, it is also to be appreciated that, rather then centrally storing such state information, it may be useful and/or necessary to store such state information with the content 12, the license 14, and/or some other object on a storage medium 24 associated with the computing device 14. As may be appreciated, such storage medium 24 may be any medium, including an optical or magnetic medium, a fixed or portable medium, etc.

In particular, in at least some situations, content owners may wish to have state information associated with a piece of content 12, a license 16, or some other similar object stored securely on the storage medium 24 with such object. Accordingly, a need exists for a system and method that enable establishing a secure storage area on a storage medium 24 associated with a computing device 14, where the secure storage area is associated with an object stored on the medium 24, and where the secure storage area can only be written to or read from by a trusted application on the computing device 14. Moreover, a need exists for such a system and method where the computing device 14 organizes and stores files on the storage medium 24 by way of an existing file system, and where the system and method utilize the existing file system on the computing device 14 to write data to and read data from the secure storage area.

SUMMARY OF THE INVENTION

The aforementioned needs are satisfied at least in part by the present invention in which a method is provided for an application on a computing device to write data to a storage medium associated with the computing device, where the data is to be written to a secure storage area associated with an object on the storage medium, and where the secure storage area has a value storage area on the storage medium associated therewith. In the method, the application and the storage medium establish a symmetric session key (KS) as a shared secret, and the application generates a nonce and employs the session key (KS) to encrypt the nonce to result in (KS(nonce)).

The application sends (KS(nonce)) to the storage medium, and the storage medium receives same and decrypts with (KS) to result in the nonce, locates the value storage area associated with the secure storage area, and stores such nonce in the located value storage area. The application employs the nonce to generate a key (KH), encrypts the data with (KH) to result in (KH(data)), and sends same to the storage medium for storage thereon in the secure storage area. Thus, (KH(data)) is associated with the nonce in the value storage area.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 2:
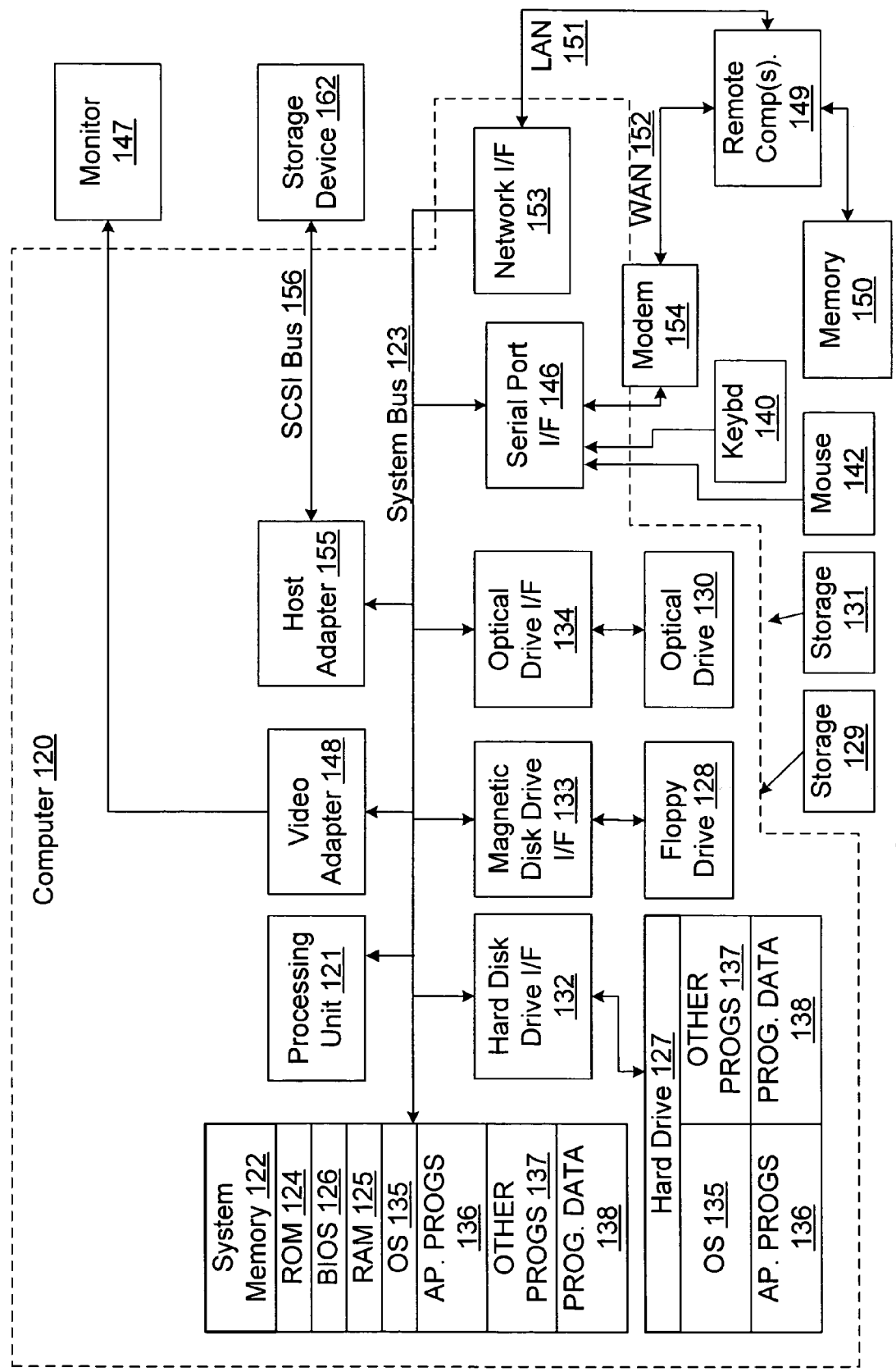
FIG. 2 is a block diagram representing a general purpose computer system in which aspects of the present invention and/or portions thereof may be incorporated.

FIG. 2 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures, and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk, a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk 127, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device, or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Secure Storage Area Associated with Object on Storage Medium 24

Content protection denotes a spectrum of methods and technologies for protecting digital content 12 such that such content 12 cannot be used in a manner inconsistent with the wishes of the content owner and/or provider. Methods include copy protection (CP), link protection (LP), conditional access (CA), rights management (RM), and digital rights management (DRM), among other. The Base of any content protection system is that only a trusted application that ensures proper adherence to the implicit and/or explicit rules for use of protected content 12 can access same in an unprotected form. Typically, content 12 is protected by being encrypted in some way, where only trusted parties are able to decrypt same.

Copy protection, in the strictest sense, specifically applies to content 12 residing in a storage device, whereas link protection applies to content 12 flowing between applications/devices over a transmission medium. Conditional access can be thought of as a more sophisticated form of link protection, where premium programs, channels and/or movies are encrypted in transit. Only subscribers who have paid for access to such content 12 are provided with the keys necessary to decrypt same.

Digital Rights Management is an extensible architecture where the rules regarding sanctioned use of a particular piece of content 12 are explicit and bound to or associated with the content 12 itself. DRM mechanisms can support richer and more expressive rules than other methods while providing greater control and flexibility at the level of individual pieces of content or even sub-components of that content. An example of a Digital Rights Management system is set forth in U.S. patent application Ser. No. 09/290,363, filed Apr. 12, 1999 and U.S. Provisional Application No. 60/126,614, filed Mar. 27, 1999 each of which is hereby incorporated by reference in its entirety.

Rights Management is a form of DRM that is organizationally based in that content 12 can be protected to be accessible only within an organization or a subset thereof. An example of a Rights Management system is set forth in U.S. patent application Ser. Nos. 10/185,527, 10/185,278, and 10/185,511, each filed on Jun. 28, 2002 and hereby incorporated by reference in its entirety.

Figure 3:
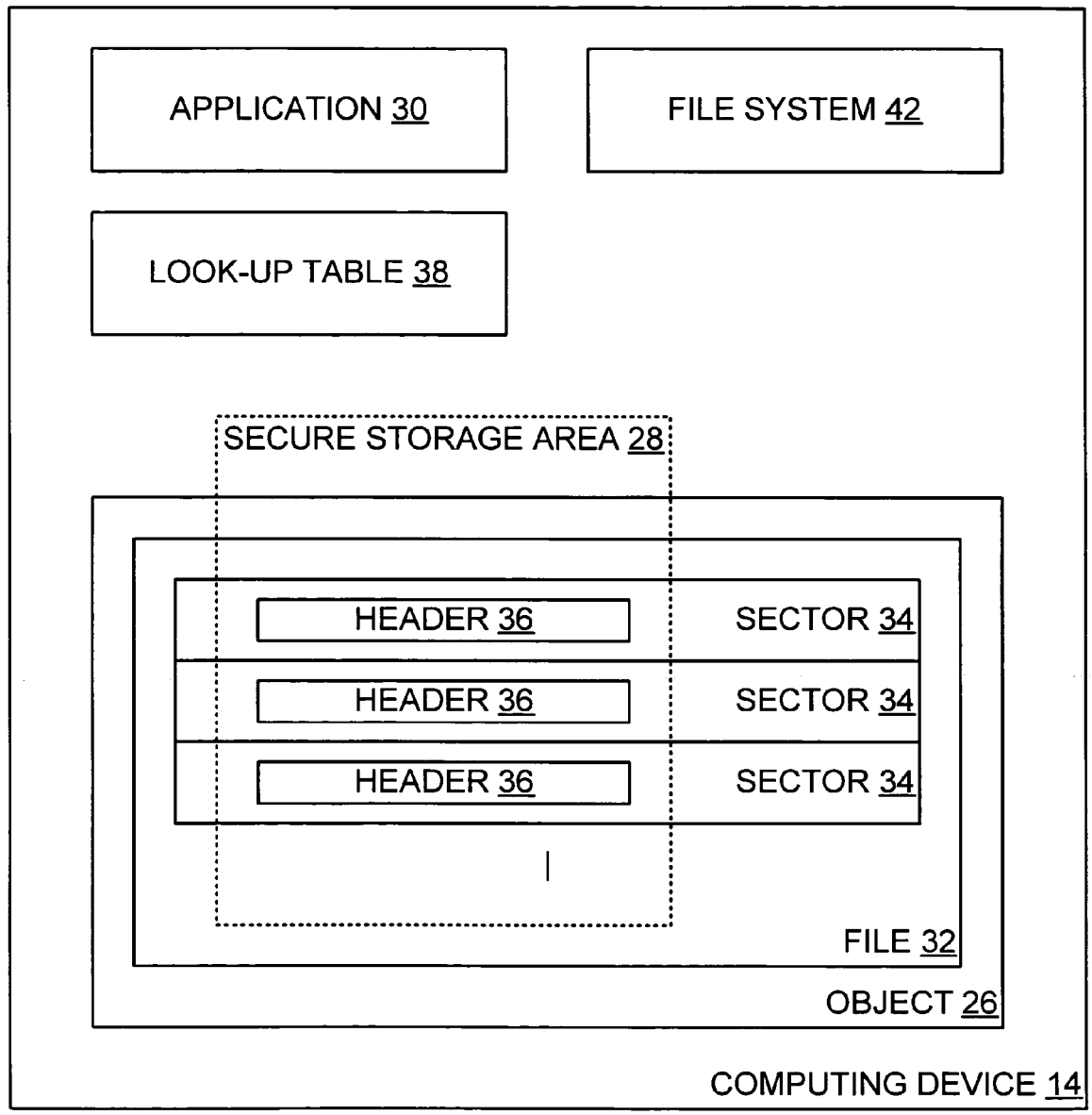
FIG. 3 is a block diagram showing a first embodiment of a system for an application to store data in a secure storage area on a storage medium in accordance with one embodiment of the present invention.

Turning now to FIG. 3, in the present invention, some sort of object 26, be it content 12, a license 16, or another object, is to be stored on a storage medium 24 associated with a computing device 14, and a secure storage area 28 is established on the storage medium 24 in a manner so that the secure storage area 28 is associated with the object 26. The secure storage area 28 can only be properly written to or read from by a trusted application 30 on the computing device 14. The computing device 14 organizes and stores files on the storage medium 24 by way of an existing file system 42 on the computing device 14, and the application 30 employs such existing file system 42 to write data to and read data from the secure storage area 28.

As with a secure store 22, the data in the secure storage area 28 may be any data without departing from the spirit and scope of the present invention, although presumably such data in the secure storage area 28 has some relevance to the associated object 26. For example, if the object 26 is content 12 or a license 16, the data could include a decryption key (KD) for decrypting content 12, or could be state information relating to a license 16. Significantly, inasmuch as such data in the secure storage area is presumed to be of a sensitive nature, such data should in at least some cases be stored in a tamper-proof manner to prevent alteration by a nefarious entity, and in a secure manner to prevent a nefarious entity from viewing same. However, inasmuch as the storage medium 24 could possibly be portable and at any rate is separate from the trusted component 18, special care must be taken to ensure such tamper-proof and secure storage, as will be set forth in more detail below.

The object 26 and associated secure storage area 28 may be any appropriate object and secure storage area without departing from the spirit and scope of the present invention. Typically, the object 26 is a piece of content 12 or a license 16 residing in one or more files on the storage medium 24 (one being shown), and the secure storage area 28 is the equivalent of a secure store 22 with state information therein relevant to the associated object 26, although it is to be appreciate that other types of objects 26 and secure storage areas 28 may be employed in the present invention. For instance, such other types of secure storage areas 28 may encompass areas on the storage medium 24 not typically associated with files 32.

Figure 1:
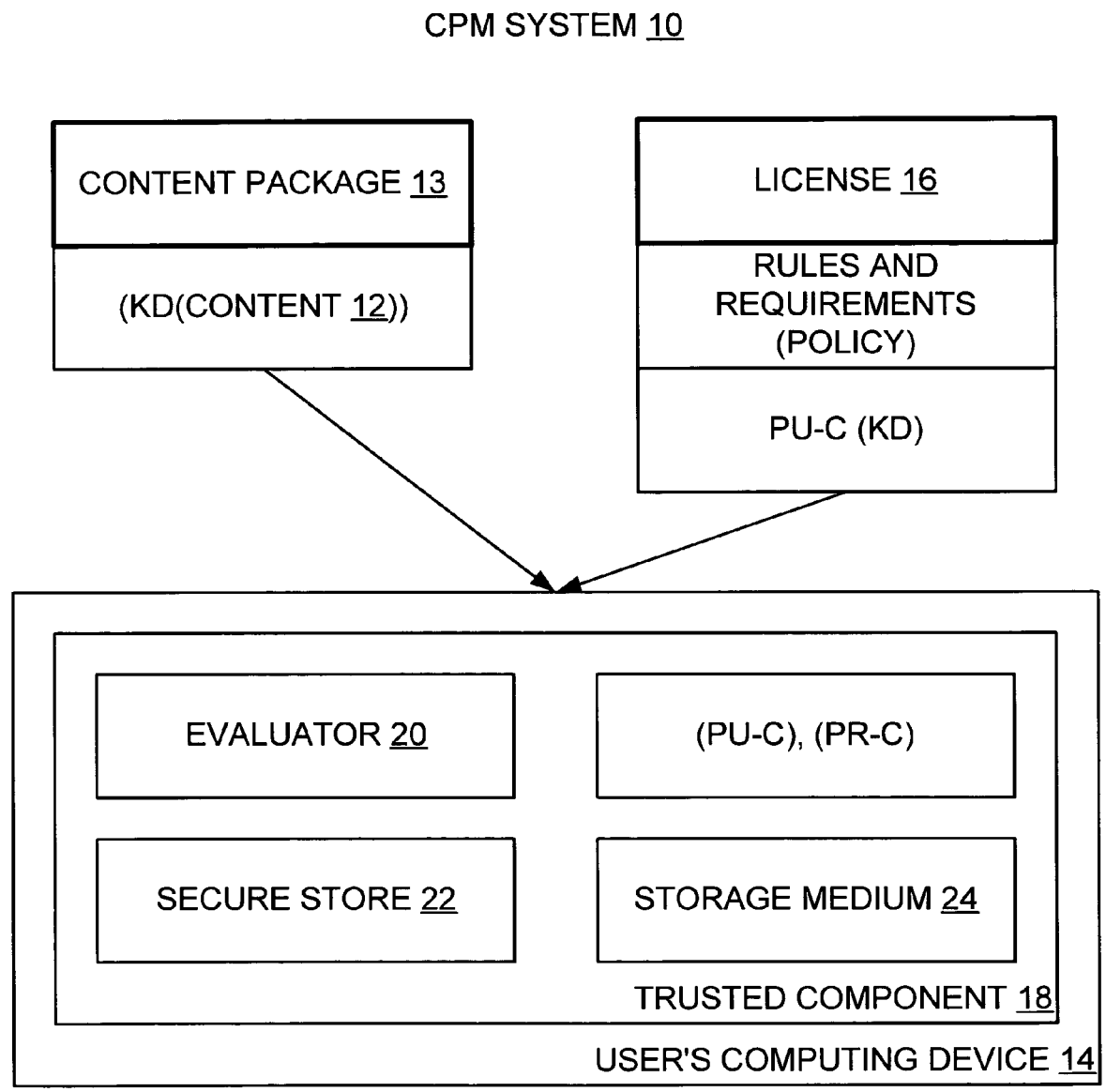
FIG. 1 is a block diagram showing an enforcement architecture of an example of a trust-based system.

The trusted application 30 on the computing device 14 may likewise be any appropriate application without departing from the spirit and scope of the present invention. Such trusted application 30 may for example be the trusted component 18 of FIG. 1, an application that directly renders content 12, or the like. As implied by the name, such trusted application 30 is in fact trusted to render content 12 within the framework of the CPM system 10 only in accordance with the rules and policy set forth in an accompanying license 16 or the like. Such trust may for example be evidenced by the trusted application 30 being in possession of a digital certificate or the like as issued by a trust authority or as derived from such a trust authority.

The storage medium 24 associated with the computing device 14 may also likewise be any appropriate medium without departing from the spirit and scope of the present invention, subject to the conditions set forth herein. For example, such storage medium 24 may be an optical or magnetic medium and may be fixed to or portable from the computing device 14. Thus, the storage medium 24 being associated with the computing device 14 requires only a temporary association at a minimum, such as for example a removable disc being inserted into a complementary drive. Although not necessarily the case in all instances, it is envisioned that the storage medium 24 can write and re-write data, or at least that the storage medium 24 can if possible logically update previously written data. The need to be able to update is not an absolute requirement of the present invention, although in cases where updating is not available it is to be appreciated that written data cannot be changed. As with the trusted application 30, the storage medium is trusted to store data in the secure storage area 28, and such trust likewise may for example be evidenced by the storage medium 24 being in possession of a digital certificate or the like as issued by a trust authority or as derived from such a trust authority.

Significantly, the storage medium 24 and the application 30 should be able to establish a secure channel therebetween, for example by way of establishing a shared secret that is employed to encrypt and decrypt communications therebetween. Establishing such a shared secret may occur by any appropriate mechanism without departing from the spirit and scope of the present invention. For example, and as should be appreciated by the relevant public, the storage medium 24 and the application 30 may establish the shared secret by mutually performing a Diffie-Hellman procedure. As part of establishing the secure channel, the storage medium 24 and the application 30 should also establish trust with each other by exchanging the aforementioned digital certificates or the like.

In one embodiment of the present invention, and as shown in FIG. 3, the storage medium 24 has or can create therein for each object 26 stored therein an associated secure storage area 28, and can physically or logically associate the secure storage area 28 with the object 26. Any appropriate associating scheme may be employed by the storage medium 24 to associate a secure storage area 28 with an object 26 without departing from the spirit and scope of the present invention. Such association may for example be created by the storage medium 24 maintaining thereon an appropriate look-up table or the like that records such association, or may for example be created by the storage medium 24 co-locating the object 26 and the associated secure storage area 28. Such co-location may be achieved by physically or logically storing the object 26 and the associated secure storage area 28 adjacent each other, or even within the same storage space.

In the latter case in particular, and as shown in FIG. 3, the object 26 may be stored as one or more files 32 on the storage medium 24 (one being shown), each file 32 is stored in one or more physical or logical sectors 34 on the storage medium 24, and each sector 34 has a sector header 36. As may be appreciated, such sector header 36 includes a predetermined amount of space for the storage medium 24 to store data such as sector data relevant to the file stored in the sector. Normally, and as should also be appreciated, such sector data in such sector header 36 is only used by the storage medium 24 and is not employed externally from the storage medium 24. Nevertheless, such sector data may be written to and read from by an external element, such as the application 30, by way of appropriate commands therefrom. Accordingly, and in one embodiment of the present invention, the storage medium 24 co-locates the object 26 and the associated secure storage area 28 by storing the secure storage area 28 associated with an object 26 in the sector headers 36 of the files 34 of the object 26. Of course, the secure storage area 28 may also be stored in other areas on the storage medium 24. For example, the storage medium 24 may set aside a number of full sectors in a lead-in area of a disc. In such a case, the secure storage area 28 for the entire disc may be the entire number of lead-in sectors, of which any portion may be associated with and used for any given object 26. Here, the association of each of the lead-in sectors in the lead-in area to a related object 26 must be maintained, perhaps in a look-up table.

Note, though, that the aforementioned scheme may be limited in that the amount of storage area for the secure storage area 28 may be limited to the space available from the sector headers 28 of the files 34 of the object 26. Thus, in a variation of the scheme set forth above, the secure storage area 28 is only logically connected to object 26. In particular, and as shown in FIG. 4, the object 26 again may be stored as one or more object files 32 on the storage medium 24, and the associated secure storage area 28 is also stored as one or more secure storage area (SSA) files 32 on the storage medium, where the storage medium 24 maintains the aforementioned look-up table 38 or the like that records such association. As should be appreciated, then, the present scheme does not limit the secure storage area 28 since the SSA files 32 thereof may be of any necessary size. Accordingly, and in one embodiment of the present invention, the storage medium 24 associates the object 26 and the associated secure storage area 28 by way of the look-up table 38 or the like.

Note that in such embodiment the SSA files 32 should be encrypted to prevent un-authorized viewing or at least signed to prevent tampering, in which case a value storage area 40 is necessary to store a value that is to be directly or indirectly employed to decrypt or verify the encrypted SSA files 32. As before, the storage medium 24 should associate the value storage area 40 with the corresponding SSA files 32 by any appropriate means. Accordingly, in one embodiment of the present invention, and as shown in FIG. 4, the storage medium 24 in fact associates the value storage area 40 with the corresponding SSA files 32 by creating the value storage area 40 in the sector headers 36 of the corresponding SSA files 32.

Figure 4:
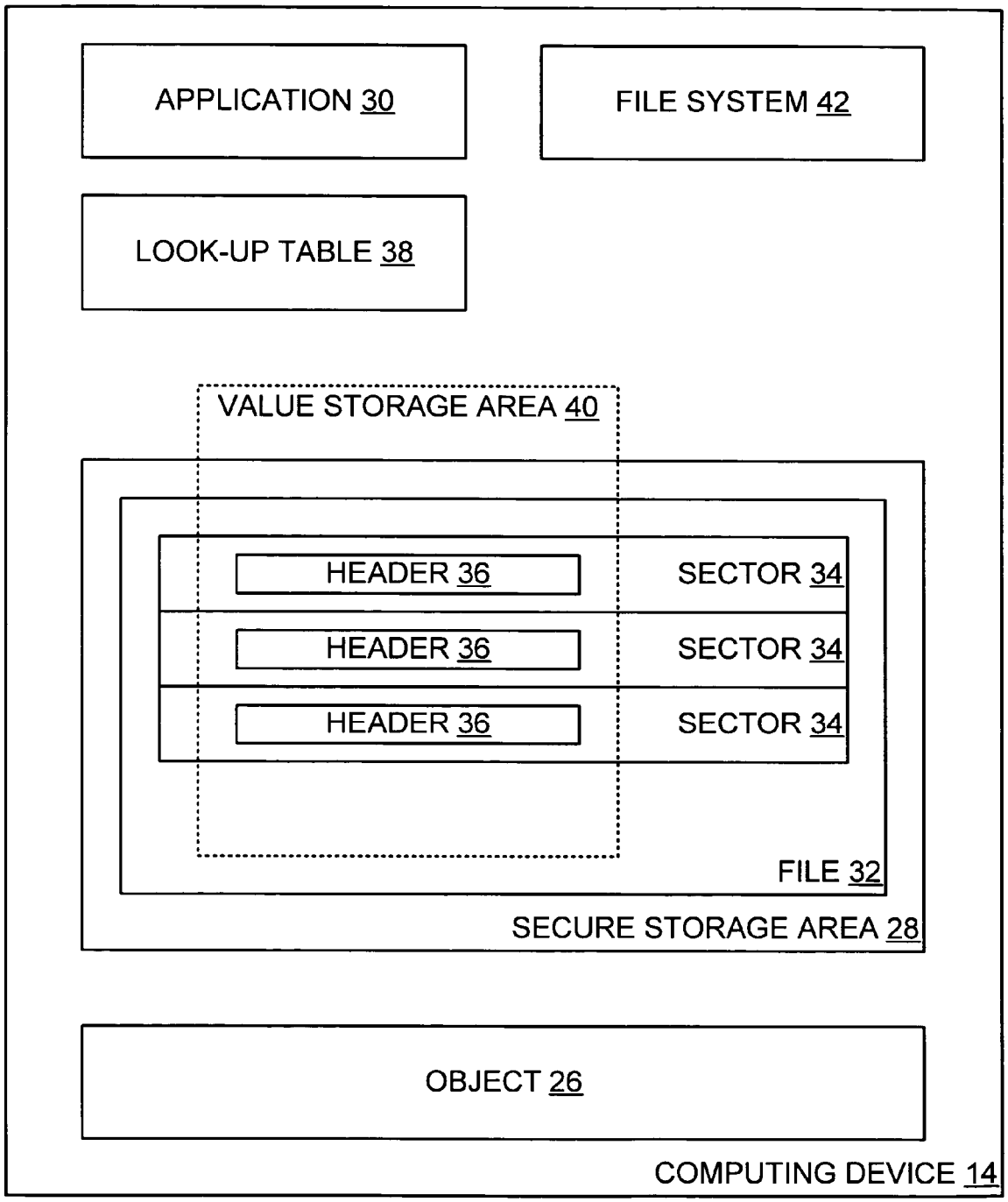
FIG. 4 is a block diagram showing a second embodiment of a system for an application to store data in a secure storage area on a storage medium in accordance with one embodiment of the present invention.

In the embodiments of FIGS. 3 and 4, and as might be appreciated, actual storage of information in sector headers 36 may be arranged according to any appropriate mechanism without departing from the spirit and scope of the present invention. For example, it may be the case that only a single instance of the information is stored, or it may be the case that multiple instances of the information is stored. Likewise, in the case of multiple object or SSA files 32, it may be the case that each of the multiple file 32 has the information or it may be the case that some or all of the multiple files 32 have the information.

In connection with the embodiment shown in FIG. 3, and in one embodiment of the present invention, and turning now to FIG. 5, the application 30 writes data to a secure storage area 28 associated with an object 26 on the storage medium 24 in the following manner. Preliminarily, the application 30 and the storage medium 24 set up the secure channel therebetween by establishing a shared secret such as a symmetric session key (KS) (step 501), and the application 30 selects a data key (KA) and encrypts the data therewith to result in (KA(data)) (step 503). Note that the data key (KA) may be selected on any basis without departing from the spirit and scope of the present invention. For example, if the object 26 is content 12 encrypted by a content key (KD), (KA) may in fact be (KD).

Note, too, that instead of encrypting the data with (KA) to result in (KA(data)), (KA) may instead be employed to construct a verifying hash by which the integrity of the data may be verified at some later time. As may be appreciated, such a verifying hash does not conceal the data but instead only ensures that the data has not been modified. Note, further, that (KA) may alternately be employed in some manner whereby such (KA) is employed to gain access to the data in a trusted manner. In such a trusted access scenario, only a trusted entity in possession of (KA) can be provided with the data. Note, finally, that the step of encrypting the data with an application-specific data key (KA) may be dispensed with in certain circumstances, such as if the storage medium 24 prevents an un-trusted application 30 from reading and/or writing the data in the sector header secure storage area 28. Thus, and more generally, any variation in which (KA), (KS), or any other key is employed to protect the data is to be considered within the spirit and scope of the present invention.

Thereafter, the application 30 encrypts (KA(data)) with the session key (KS) to result in (KS(KA(data))) (step 505), and sends such (KS(KA(data))) to the storage medium 24 for storage in the secure storage area 28 associated with the object 26 (step 507). Note here that if the data is double encrypted with both (KA) and (KS), even the storage medium 24 upon decrypting (KS(KA(data))) with (KS) to result in (KA(data)) cannot view the data inasmuch as only the application 30 has knowledge of (KA) and can apply same to (KA(data)) to reveal the data.

In one embodiment of the present invention, the application 30 in fact sends such (KS(KA(data))) to the storage medium 24 for storage in the secure storage area 28 associated with the object 26 as at step 507 by way of an existing file system 42 associated with the computing device 14 and in particular an established 'secure write' command thereof, and does not employ any special direct write or direct access procedures. Thus, the file system 42 of the computing device 14 is responsible for receiving the secure write command and acting upon same. Accordingly, the application 30 need not be provided with any special direct write or direct access procedures that are specific to any particular file system 42 or storage medium 24, and the application 30 therefore can employ the method set forth herein with any of several file systems 42 and storage media 24. In an alternate embodiment of the present invention, the application 30 in fact sends such (KS(KA(data))) to the storage medium 24 for storage in the secure storage area 28 associated with the object 26 as at step 507 by way of the existing file system 42 and a combination of commands to the file system 42 and direct queries to the storage medium 24 to ascertain, for example, the location of a particular sector header 36.

Based on the established secure write command of the file system 42 of the computing device 14, then, the application 30 in the secure write command in fact identifies (1) a location such as a buffer or the like from which (KS(KA(data))) may be found, (2) the object 26 associated with or to be associated with the secure storage area 28 that is to receive such (KS(KA(data))), and (3) a length of such (KS(KA(data))). With such secure write command, then, the file system 42 locates (KS(KA(data))) and in fact sends a request to the storage medium 24 with such (KS(KA(data))), along with the identification of the associated object 26, and a notification to the effect that the storage medium 24 is to write (KA(data)) to the secure storage area 28 associated with the identified object 26.

Thus, upon receiving such request, the storage medium 24 decrypts (KS(KA(data))) with (KS) to result in (KA(data)) (step 509), locates the secure storage area 28 associated with the identified object 26 (step 511), and in fact stores such (KA(data)) in the located secure storage area 28 (step 513). As was set forth above, the storage medium 24 may locate the secure storage area 28 associated with the identified object 26 as at step 511 based on a look-up table 38 or the like, or may simply employ the sector headers 36 of the identified object 26 as the secure storage area 28. Note, though that in either instance it may be the case that the identified object 26 has in fact not as yet been created on the storage medium 24. In such a case, the storage medium 24 may either create at least a dummy representation of the identified object 26 thereon as a placeholder and then store (KA(data)) in the secure storage area 28 associated therewith, or may cache (KA(data)) until the object 26 is created and then store (KA(data)) in the secure storage area 28 associated therewith (step 512). As should be appreciated, in the former case, the dummy object 26 is replaced with the object 26 when created and the association with the secure storage area 28 is appropriately maintained.

Figure 5:
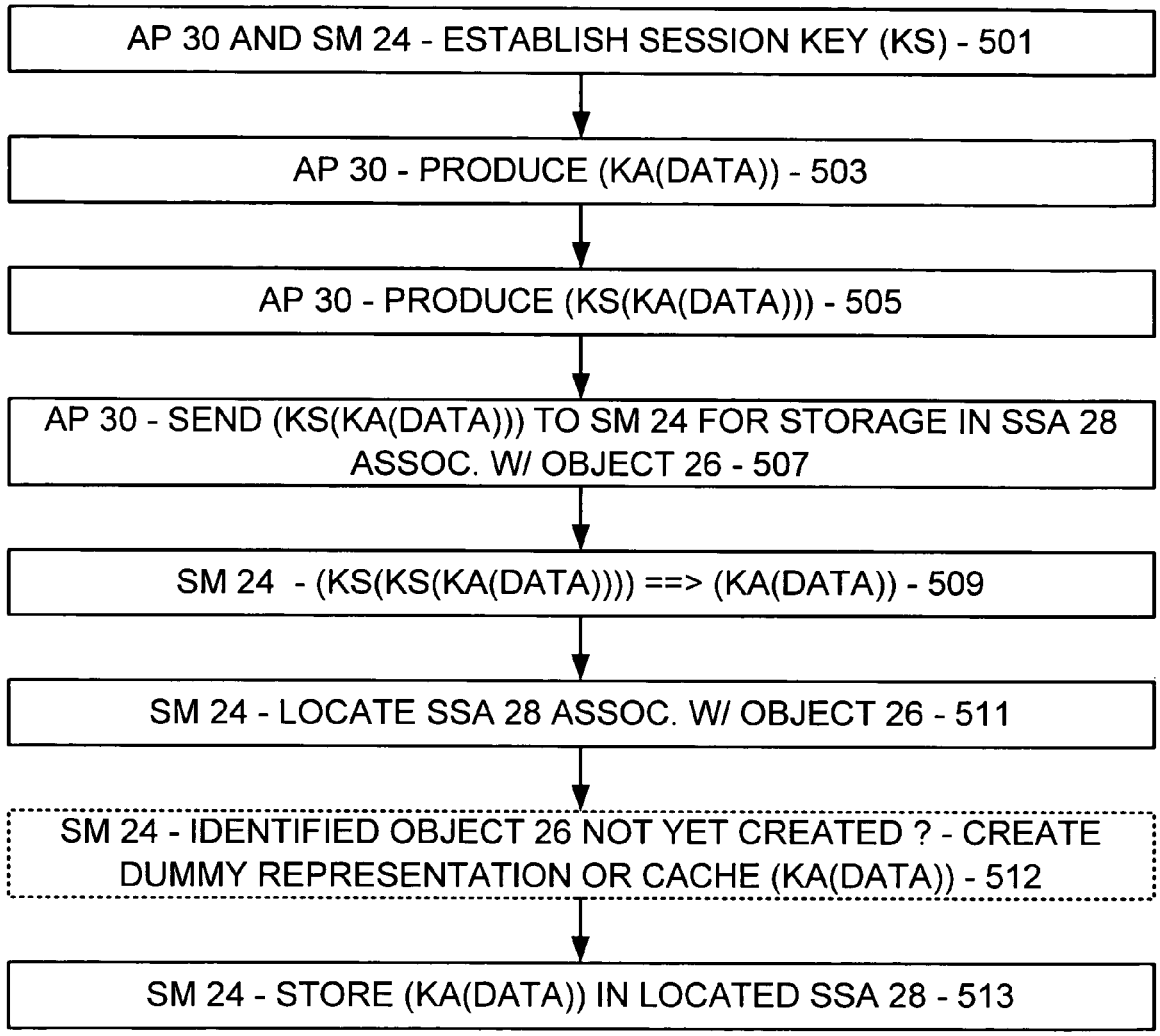
FIGS. 5 and 6 are flow diagrams showing key steps performed by the application and storage medium of FIG. 3 when writing data to the secure storage area (FIG. 5) and reading data from the secure storage area (FIG. 6) in accordance with one embodiment of the present invention.
Figure 6:
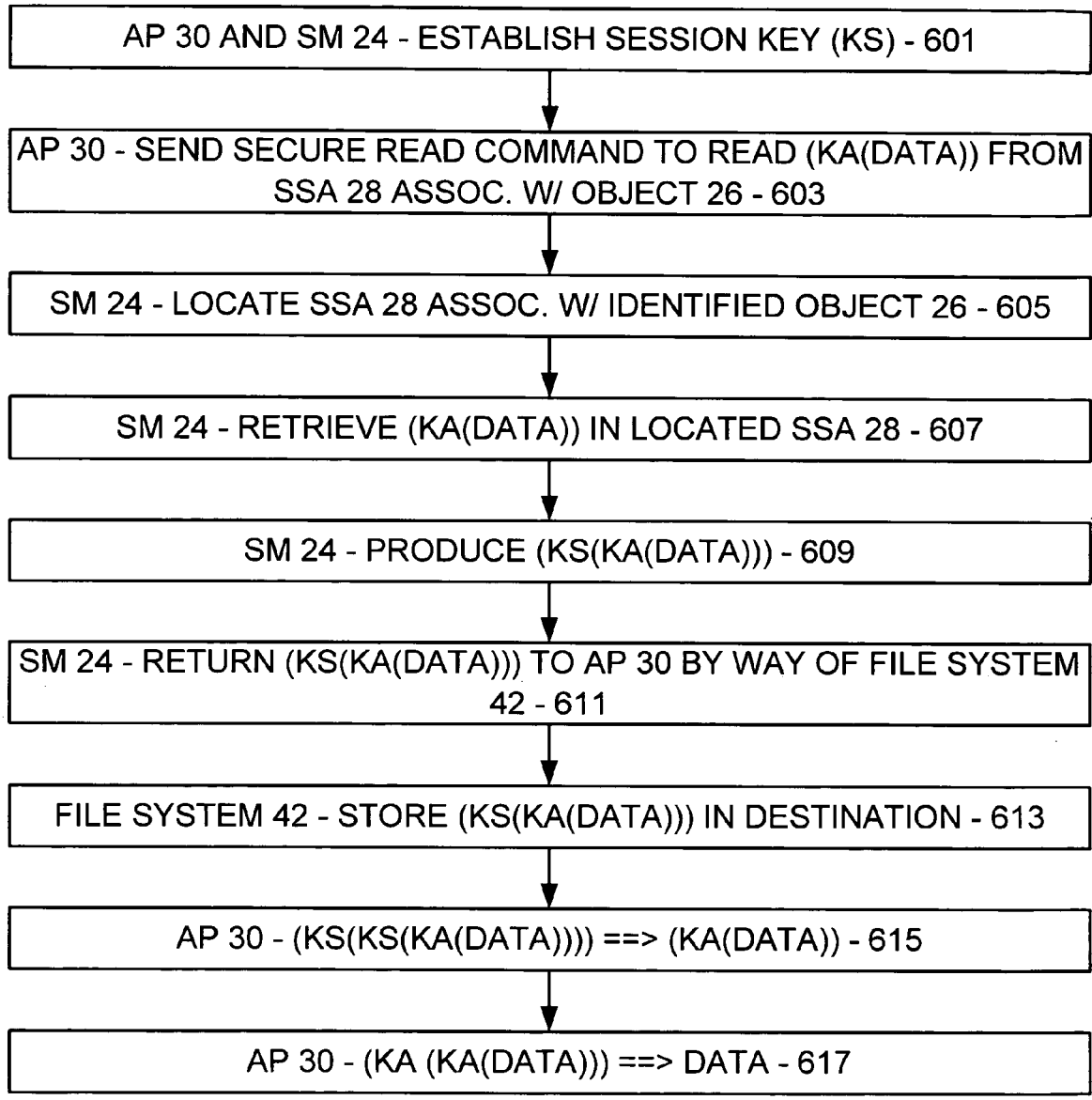

Turning now to FIG. 6, the data written to the storage medium 24 by the application 30 in the manner shown in FIG. 5 (i.e., (KA(data))) may be retrieved in the following manner. Preliminarily, and again, the application 30 and the storage medium 24 set up the secure channel therebetween by establishing a shared secret such as a symmetric session key (KS) (step 601), and the application 30 sends a 'secure read' command to read (KA(data)) from the secure storage area 28 associated with a particular object 26 (step 603).

Similar to before, the secure read command from the application 30 as at step 603 is sent by way of an existing file system 42 associated with the computing device 14 and in particular an established 'secure read' command thereof, and the application 30 again does not employ any special direct read or direct access procedures. Thus, the file system 42 of the computing device 14 is responsible for receiving the secure read command and acting upon same. Accordingly, the application 30 need not be provided with any special direct read or direct access procedures that are specific to any particular file system 42 or storage medium 24, and the application 30 therefore can employ the method set forth herein with any of several file systems 42 and storage media 24. Alternately, the application 30 reads (KA(data)) from the storage medium 24 by way of the existing file system 42 and a combination of commands to the file system 42 and direct queries to the storage medium 24 to ascertain, for example, the location of a particular sector header 36.

Based on the established secure read command of the file system 42 of the computing device 14, then, the application 30 in the secure read command in fact identifies (1) the object 26 associated with the secure storage area 28 that contains such (KA(data)), (2) a destination location for (KA(data)), such as a buffer or the like, and (3) a length of such (KA(data)) within the secure storage area 28. With such secure read command, then, the file system 42 in fact sends a request to the storage medium 24 to locate the identified associated object 26, and including a notification to the effect that the storage medium 24 is to read (KA(data)) from the secure storage area 28 associated with the identified object 26.

Thus, upon receiving such request, the storage medium 24 in fact locates the secure storage area 28 associated with the identified object 26 (step 605), retrieves such (KA(data)) in the located secure storage area 28 (step 607), encrypts (KA(data)) with (KS) to result in (KS(KA(data))) (step 609), and returns such (KS(KA(data))) to the file system 42 in response to the request (step 611). Again, the storage medium 24 may locate the secure storage area 28 associated with the identified object 26 as at step 605 based on a look-up table 38 or the like, or may simply employ the sector headers 36 of the identified object 26 as the secure storage area 28.

With such (KS(KA(data))), then, the file system 42 stores same in the destination location (step 613). Thereafter, the application 30 applies (KS) to such (KS(KA(data))) to result in (KA(data)) (step 615), obtains (KA) and applies same to (KA(data)) to result in the data (step 617), and then employs the data as appropriate. Note that the application 30 may obtain (KA) from whatever source and in whatever manner without departing from the spirit and scope of the present invention. Note, too, that in employing the data, the application 30 may modify same, in which case such data may again be stored in the secure storage area 28 associated with the object 26 by way of the method set forth in connection with FIG. 5.

In connection with the embodiment shown in FIG. 4, and in another embodiment of the present invention, and turning now to FIG. 7, the application 30 writes data to a secure storage area 28 associated with an object 26 on the storage medium 24 in the following manner. Preliminarily, the application 30 and the storage medium 24 again set up the secure channel therebetween by establishing a shared secret such as a symmetric session key (KS) (step 701). Here, though, the application generates a nonce or random number (step 703), which as will be set forth in more detail will be part of a hash to generate a key, and then employs the session key (KS) to encrypt the nonce to result in (KS(nonce)) (step 705).

Thereafter, the application 30 sends such (KS(nonce)) to the storage medium 24 for storage in a value storage area 40 associated with or to be associated with a secure storage area 28 (step 707). In one embodiment of the present invention, the application 30 in fact sends such (KS(nonce)) to the storage medium 24 for storage in the value storage area 28 associated with the secure storage area 28 as at step 707 by way of the existing file system 42 associated with the computing device 14 and in particular an established 'value write' command thereof, and does not employ any special direct write or direct access procedures. Thus, the file system 42 of the computing device 14 is responsible for receiving the value write command and acting upon same. Accordingly, the application 30 need not be provided with any special direct write or direct access procedures that are specific to any particular file system 42 or storage medium 24, and the application 30 therefore can employ the method set forth herein with any of several file systems 42 and storage media 24. In an alternate embodiment of the present invention, the application 30 in fact sends such (KS(nonce)) to the storage medium 24 for storage in the secure storage area 28 associated with the object 26 as at step 707 by way of the existing file system 42 and a combination of commands to the file system 42 and direct queries to the storage medium 24 to ascertain, for example, the location of a particular sector header 36.

Based on the established value write command of the file system 42 of the computing device 14, then, the application 30 in the value write command in fact identifies (1) a location such as a buffer or the like from which (KS(nonce)) may be found, (2) the secure storage area 28 associated with or to be associated with the value storage area 40 that is to receive such (KS(nonce)), and (3) a length of such (KS(nonce)). With such value write command, then, the file system 42 locates (KS(nonce)) and in fact sends a request to the storage medium 24 with such (KS(nonce)), along with the identification of the associated secure storage area 28, and a notification to the effect that the storage medium 24 is to write the nonce to the value storage area 40 associated with the identified secure storage area 28.

Thus, upon receiving such request, the storage medium 24 decrypts (KS(nonce)) with (KS) to result in the nonce (step 709), locates the value storage area 40 associated with the identified secure storage area 28 (step 7.11), and in fact stores such nonce in the located value storage area 40 (step 713). As was set forth above, the storage medium 24 may locate the value storage area 40 associated with the identified secure storage area 28 as at step 711 based on a look-up table 38 or the like, or may simply employ the sector headers 36 of the identified secure storage area 28 as the value storage area 40. Note, though that in either instance it may be the case that the identified secure storage area 28 has in fact not as yet been created on the storage medium 24. In such a case, the storage medium 24 may either create at least a dummy representation of the identified secure storage area 28 thereon as a placeholder and then store the nonce in the value storage area 40 associated therewith, or may cache the nonce until the secure storage area 28 is created and then store the nonce in the value storage area 40 associated therewith (step 712). As should again be appreciated, in the former case, the dummy secure storage area 28 is replaced with the secure storage area 28 when created and the association with the value storage area 40 is appropriately maintained.

As was alluded to above, the nonce is employed by the application 30 as part of a hash to generate a hash key (KH), where such hash key (KH) is employed to encrypt the data that is to be stored in the secure storage area 28. Notably, and as should be evident in connection with step 712, such encryption and storage of such data in the secure storage area 28 may occur before or after the nonce is stored in the value storage area 40. Nevertheless, in either case the process is substantially similar if not identical. In particular, in one embodiment of the present invention, to encrypt the data that is to be stored in the secure storage area 28, the application 30 combines the nonce and a data key (KA) in some predetermined manner and executes a one-way hash over the combination to result in a hash key (KH) (step 715), and then employs the hash key (KH) to encrypt the data to result in (KH(data)) (step 717). Note that the data key (KA) may be selected on any basis without departing from the spirit and scope of the present invention. For example, if the associated object 26 is content 12 encrypted by a content key (KD), (KA) may in fact be (KD).

Upon producing (KH(data)) as at step 717, the application 30 then sends same to the storage medium 24 for storage therein in a secure storage area 28 in a manner such that (KH(data)) is associated with the nonce in the corresponding value storage area 40 (step 719). Such sending may be achieved by a standard write command of the file system 42 of the computing device 14 in the case where the secure storage area 28 is merely a file 32 on the storage medium 24.

Note here that the method as set forth in connection with FIG. 7 does not rely on when or even whether an object 26 associated with the secure storage area 28 exists on the storage medium 24. In fact, such an object 26 could be created before, during or after the secure storage area 28 is created, and in certain circumstances might never be created at all.

Note, too, that in the method as set forth in connection with FIG. 7, the nonce in the value storage area 40 need not be encrypted. Presumably, even though such nonce may be obtained by a nefarious entity wishing to view and/or alter the underlying data in the secure storage area 28, such nefarious entity should have no way to obtain the data key (KA) that was hashed with the nonce to produce the hash key (KH) as at step 715, and therefore cannot apply (KH) to (KH(data)) to expose such data.

Note, further, that by employing a nonce in the manner set forth in connection with FIG. 7, an application 30 may terminate use of the associated object 26 merely by replacing or updating the nonce in the value storage area 40 to a different value, by way of a value change command to the existing file system 42 of the computing device. As should be understood, by changing the value of the nonce in the value storage area 40, the data in the associated secure storage area 28 can no longer be accessed inasmuch as the changed nonce will produce a different hash key (KH(x+1)) as at step 715, and such different hash key (KH(x+1)) will not decrypt the data encrypted according to (KH(x)). As should be further understood, without such data, the associated object 26 is inaccessible. Thus, when terminating use of the associated object 26, the application 30 need not physically delete same from the storage medium 24, which could be a great burden in the case where such object 26 is very large, perhaps on the order of gigabytes.

Figure 7:
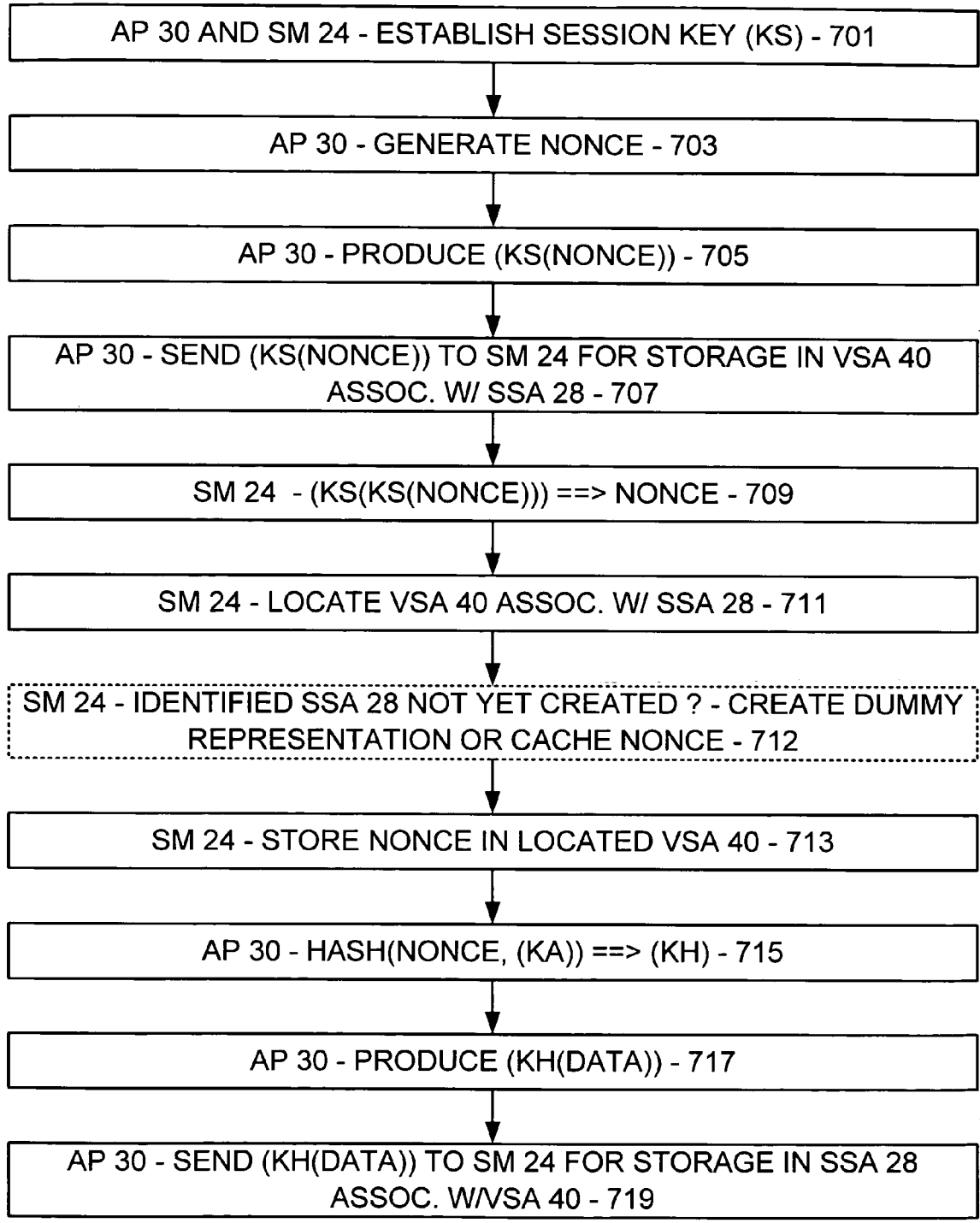
FIGS. 7 and 8 are flow diagrams showing key steps performed by the application and storage medium of FIG. 4 when writing data to the secure storage area (FIG. 7) and reading data from the secure storage area (FIG. 8) in accordance with one embodiment of the present invention.
Figure 8:
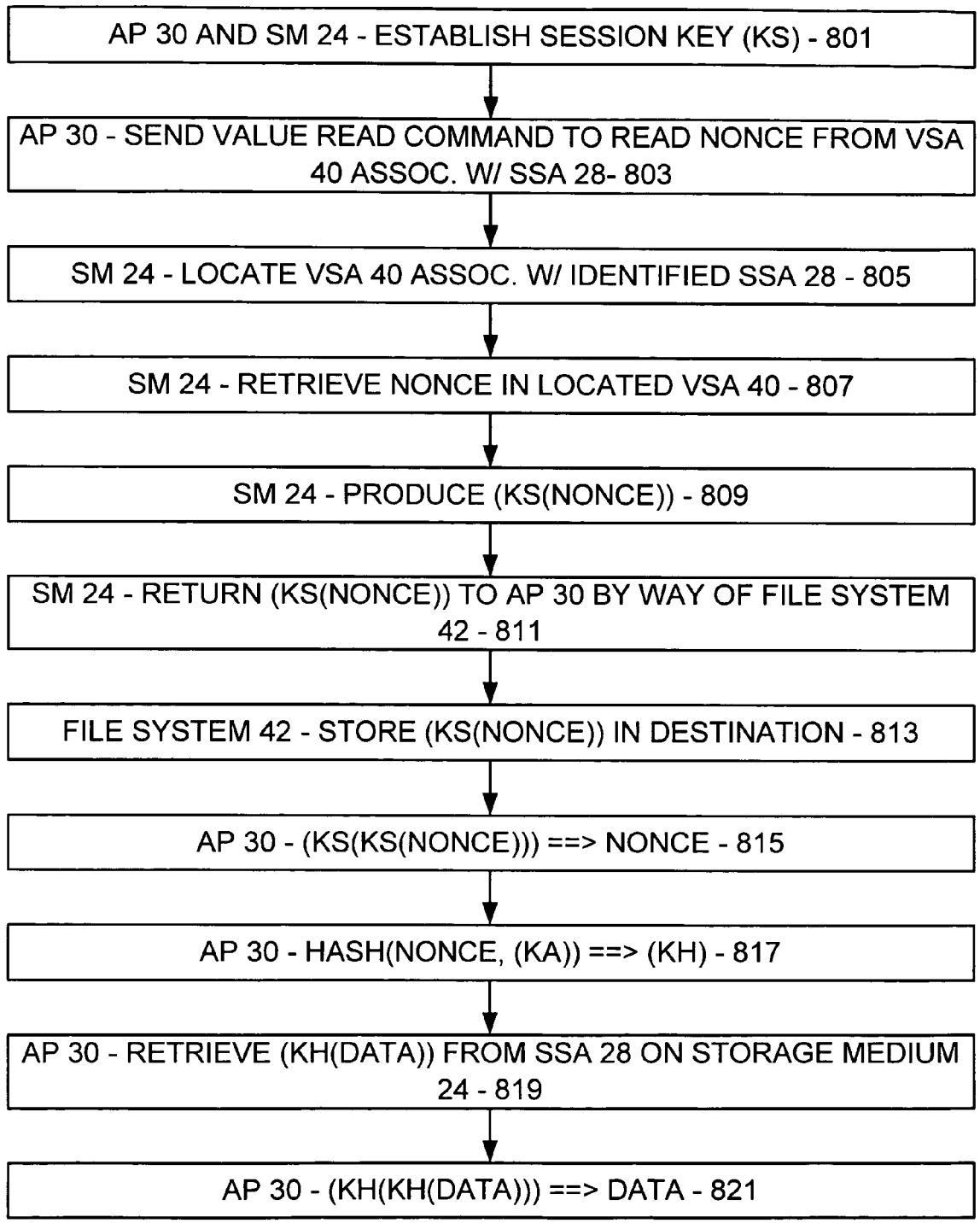

Turning now to FIG. 8, the data written to the storage medium 24 by the application 30 in the manner shown in FIG. 7 (i.e., (KH(data))) may be retrieved in the following manner. Preliminarily, and again, the application 30 and the storage medium 24 set up the secure channel therebetween by establishing a shared secret such as a symmetric session key (KS) (step 801), and the application 30 sends a 'value read' command to read the nonce from the value storage area 40 associated with a particular secure storage area 28 (step 803).

Similar to before, the value read command from the application 30 as at step 803 is sent by way of an existing file system 42 associated with the computing device 14 and in particular an established 'value read' command thereof, and the application 30 again does not employ any special direct read or direct access procedures. Thus, the file system 42 of the computing device 14 is responsible for receiving the value read command and acting upon same. Accordingly, the application 30 need not be provided with any special direct read or direct access procedures that are specific to any particular file system 42 or storage medium 24, and the application 30 therefore can employ the method set forth herein with any of several file systems 42 and storage media 24. In an alternate embodiment of the present invention, the application 30 reads such (KA(data))) from the storage medium 24 by way of the existing file system 42 and a combination of commands to the file system 42 and direct queries to the storage medium 24 to ascertain, for example, the location of a particular sector header 36.

Based on the established value read command of the file system 42 of the computing device 14, then, the application 30 in the value read command in fact identifies (1) the secure storage area 28 associated with the value storage area 40 that contains such nonce, (2) a destination location for the nonce, such as a buffer or the like, and (3) a length of such nonce within the value storage area 40. With such value read command, then, the file system 42 in fact sends a request to the storage medium 24 to locate the identified associated secure storage area 28, and including a notification to the effect that the storage medium 24 is to read the nonce from the value storage area 40 associated with the identified secure storage area 28.

Thus, upon receiving such request, the storage medium 24 in fact locates the value storage area 40 associated with the identified secure storage area 28 (step 805), retrieves such nonce in the located value storage area 40 (step 807), encrypts the nonce with (KS) to result in (KS(nonce)) (step 809), and returns such (KS(nonce)) to the file system 42 in response to the request (step 811). Again, the storage medium 24 may locate the value storage area 40 associated with the identified secure storage area 28 as at step 805 based on a look-up table 38 or the like, or may simply employ the sector headers 36 of the identified secure storage area 28 as the value storage area 40.

With such (KS(nonce)), then, the file system 42 stores same in the destination location (step 813). Thereafter, the application 30 applies (KS) to such (KS(nonce)) to result in the nonce (step 815), obtains the data key (KA), combines the nonce and (KA) in the predetermined manner and executes the one-way hash over the combination to result in the hash key (KH) (step 817), retrieves (KH(data)) from the secure storage area 28 thereof on the storage medium 24 (step 819), employs the hash key (KH) to decrypt (KH(data)) to result in the data (step 821), and then employs the data as appropriate.

Similar to before, the application 30 may retrieve (KH (data)) from the storage medium 24 as at step 819 by a standard read command of the file system 42 of the computing device 14 in the case where the secure storage area 28 is merely a file 32 on the storage medium 24. Also similar to before, the method as set forth in connection with FIG. 8 does not rely on when or even whether an object 26 associated with the secure storage area 28 exists on the storage medium 24.

In comparing the first variation of the present invention as shown in FIGS. 3, 5, and 6 with the second variation as shown in FIGS. 4, 7, and 8, it is to be appreciated that the first variation is limited in that the amount of storage area for the secure storage area 28 is limited to the space available from the sector headers 28 of the files 34 of the object 26, and that such first variation actually requires the existence of such object 26. In contrast, the second variation is not so limited inasmuch as the secure storage area 28 is a file or files 34 separate from the file of the associated object 26. However, in such variation, to protect the secure storage area 28, a nonce is employed as an additional item and is therefore stored in a value storage area 40 associated with the secure storage area 28. The amount of storage area for the value storage area 40 is limited to the space available from the sector headers 28 of the files 34 of the secure storage area object 28, but such a limitation is not believed to be limiting inasmuch as the nonce only requires a small amount of space, on the order of 128 bytes or a kilobyte or so.

Note that in either variation of the present invention, it may be possible for an un-trusted application to write data to or read data from areas of the storage medium 24 set aside for the secure storage area 28 and/or the value storage area 40. However, and importantly, such an un-trusted application cannot recover in an un-encrypted form data securely stored to a secure storage area 28. As should be appreciated, though such un-trusted application may be able to read encrypted data from the secure storage area 28, the read data cannot be decrypted by the un-trusted application, which presumably does not have access to the key (KA).

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful system and method that enables establishing a secure storage area 28 on a storage medium 24 associated with a computing device 14, where the secure storage area 28 is or can be associated with an object 26 stored on the medium 24, and where the secure storage area 28 can only be written to or read from by a trusted application 30 on the computing device 14. The computing device 14 organizes and stores files on the storage medium 24 by way of an existing file system 42, and the system and method utilize the existing file system 42 on the computing device 14 to write data to and read data from the secure storage area 28.

The system and method may also utilize either the existing file system 42 on the computing device 14 or a combination of the existing file system 42 and direct commands to the storage medium 24 to write data to and read data from the secure storage area 28. In such case, the application 30 may if necessary request the file system 42 to allocate sectors 34 for a file 32 related to the secure storage area 28 or object 26, and request an identification of the allocated sectors 34. Thereafter, the application 30 may send a command akin to a secure write, secure read, value write, or value read command to the storage medium 24, including the identification of the sectors 34 or headers 36 thereof, and the data to be written thereto or read therefrom. Thus, an existing file system 42 that does not support the aforementioned secure commands may be employed without modification.

It should be appreciated that changes could be made to the embodiments described above without departing from the inventive concepts thereof. In general then, it should be understood that the present invention is not limited to the particular embodiments disclosed, but is intended to cover modifications within the spirit and scope of the present invention as defined by the appended claims.

What is claimed is:

1. A method for an application on a computing device to write data to a storage medium associated with the computing device, the data to be written to a secure storage area associated with an object on the storage medium, the method comprising:
   the application and the storage medium establishing a session key (KS) as a shared secret;
   the application selecting a data key (KA) and protecting the data therewith to result in (KA(data));
   the application encrypting (KA(data)) with the session key (KS) to result in (KS(KA(data))) and sending same to the storage medium;
   the storage medium receiving (KS(KA(data))) and decrypting same with (KS) to result in (KA(data)), locating the secure storage area associated with the object, and storing such (KA(data)) in the located secure storage area.

2. The method of claim 1 comprising the application sending (KS(KA(data))) to the storage medium by way of an existing file system associated with the computing device and an established 'secure write' command thereof.

3. The method of claim 2 comprising the application identifying by way of the secure write command a location from which (KS(KA(data))) may be found and the object associated with or to be associated with the secure storage area that is to receive such (KS(KA(data))), the method further comprising the file system locating (KS(KA(data))) and sending a request to the storage medium with (KS(KA(data))) and the identification of the associated object, and the storage medium writing (KA(data)) to the secure storage area associated with the identified object.

4. The method of claim 1 comprising the storage medium locating the secure storage area associated with the object based on a look-up table.

5. The method of claim 1 wherein the object comprises at least one file stored on at least one sector on the storage medium, and wherein the sector includes a sector header on the storage medium, the method comprising the storage medium locating the secure storage area associated with the object as the sector header of the sector of the file of the object.

6. The method of claim 1 wherein locating the secure storage area associated with the object comprises the storage medium determining that the object has not as yet been created on the storage medium and one of creating a dummy representation of the object as a placeholder and caching (KA(data)) until the object is created.

7. The method of claim 1 further comprising reading the stored data by:
   the application and the storage medium establishing a session key (KS) as a shared secret;
   the application requesting (KA(data)) from the secure storage area associated with the object;
   the storage medium retrieving (KA(data)) from the secure storage area, encrypting (KA(data)) with (KS) to result in (KS(KA(data))), and returning (KS(KA(data)));
   the application receiving (KS(KA(data))), applying (KS) thereto to result in (KA(data)), obtaining (KA) and applying same to (KA(data)) to result in the data.

8. The method of claim 7 comprising the application requesting (KA(data))) by way of an existing file system associated with the computing device and an established 'secure read' command thereof.

9. The method of claim 8 comprising the application identifying by way of the secure read command the object and a destination location for (KA(data)), the method further comprising the file system sending a request to the storage medium to locate the identified object, the storage medium reading (KA(data)) from the secure storage area associated with the identified object.

10. The method of claim 1 comprising the application selecting a data key (KA) and encrypting the data therewith to result in (KA(data)).

11. A method for an application on a computing device to write data to a storage medium associated with the computing device, the data to be written to a secure storage area associated with an object on the storage medium, the secure storage area having a value storage area on the storage medium associated therewith, the method comprising:
the application and the storage medium establishing a session key (KS) as a shared secret;
the application generating a nonce and employing the session key (KS) to encrypt the nonce to result in (KS(nonce));
the application sending (KS(nonce)) to the storage medium;
the storage medium receiving (KS(nonce)) and decrypting same with (KS) to result in the nonce, locating the value storage area associated with the secure storage area, and storing such nonce in the located value storage area;
the application employing the nonce to generate a key (KH), protecting the data with (KH) to result in (KH(data)), and sending same to the storage medium for storage thereon in the secure storage area;
whereby (KH(data)) is associated with the nonce in the value storage area.

12. The method of claim 11 comprising the application combining the nonce and a data key (KA) in a predetermined manner and executing a one-way hash over the combination to result in the key (KH).

13. The method of claim 11 comprising the application sending (KS(nonce)) to the storage medium by way of an existing file system associated with the computing device and an established 'value write' command thereof.

14. The method of claim 13 comprising the application identifying by way of the value write command a location from which (KS(nonce)) may be found and the secure storage area associated with or to be associated with the value storage area that is to receive such (KS(nonce)), the method further comprising the file system locating (KS(nonce)) and sending a request to the storage medium with (KS(nonce)), the identification of the associated secure storage area, and the storage medium writing the nonce to the value storage area associated with the identified secure storage area.

15. The method of claim 11 comprising the storage medium locating the value storage area associated with the secure storage area based on a look-up table.

16. The method of claim 11 wherein the secure storage area comprises at least one file stored on at least one sector on the storage medium, and wherein the sector includes a sector header on the storage medium, the method comprising the storage medium locating the value storage area associated with the secure storage area as the sector header of the sector of the file of the secure storage area.

17. The method of claim 11 wherein locating the value storage area associated with the secure storage area comprises the storage medium determining that the secure storage area has not as yet been created on the storage medium and one of creating a dummy representation of the secure storage area as a placeholder and caching the nonce until the secure storage area is created.

18. The method of claim 11 further comprising reading the stored data by:
the application and the storage medium establishing a session key (KS) as a shared secret;
the application requesting the nonce from the value storage area associated with the secure storage area;
the storage medium retrieving the nonce from the value storage area, encrypting the nonce with (KS) to result in (KS(nonce)), and returning (KS(nonce));
the application receiving (KS(nonce)) and applying (KS) thereto to result in the nonce;
the application employing the nonce to generate the key (KH), retrieving (KH(data)) from the secure storage area on the storage medium, and applying the key (KH) to decrypt (KH(data)) to result in the data.

19. The method of claim 18 comprising the application requesting the nonce by way of an existing file system associated with the computing device and an established 'value read' command thereof.

20. The method of claim 19 comprising the application identifying by way of the value read command the secure storage area and a destination location for the nonce, the method further comprising the file system sending a request to the storage medium to locate the identified secure storage area, the storage medium reading the nonce from the value storage area associated with the identified secure storage area.

21. The method of claim 11 further comprising terminating use of the data in the secure storage area by replacing the nonce in the value storage area with a different value.

22. A method for an application on a computing device to read data from a storage medium associated with the computing device, the data on the storage medium in a secure storage area associated with an object on the storage medium, the secure storage area having a value storage area on the storage medium associated therewith, the storage medium storing a nonce in the value storage area, the nonce being employed to generate a key (KH), the data being protected with (KH) to result in (KH(data)) and stored in the secure storage area as such (KH(data)) such that (KH(data)) in the secure storage area is associated with the nonce in the value storage area, the method comprising:
the application and the storage medium establishing a session key (KS) as a shared secret;
the application requesting the nonce from the value storage area associated with the secure storage area;
the storage medium retrieving the nonce from the value storage area, encrypting the nonce with (KS) to result in (KS(nonce)), and returning (KS(nonce));
the application receiving (KS(nonce)) and applying (KS) thereto to result in the nonce;
the application employing the nonce to generate the key (KH), retrieving (KH(data)) from the secure storage area on the storage medium, and applying the key (KH) to decrypt (KH(data)) to result in the data.

23. The method of claim 22 comprising the application requesting the nonce by way of an existing file system associated with the computing device and an established 'value read' command thereof.

24. The method of claim 23 comprising the application identifying by way of the value read command the secure storage area and a destination location for the nonce, the method further comprising the file system sending a request to the storage medium to locate the identified secure storage area, the storage medium reading the nonce from the value storage area associated with the identified secure storage area.

25. A method for an application on a computing device to read data from a storage medium associated with the computing device, the data on the storage medium in a secure storage area associated with an object on the storage medium, the data in the secure storage area being protected with (KA) to result in (KA(data)) and stored in the secure storage area as such (KA(data)) such that (KA(data)) in the secure storage area is associated with the object, the method comprising:

the application and the storage medium establishing a session key (KS) as a shared secret;

the application requesting (KA(data)) from the secure storage area associated with the object;

the storage medium retrieving (KA(data)) from the secure storage area, encrypting (KA(data)) with (KS) to result in (KS(KA(data))), and returning (KS(KA(data)));

the application receiving (KS(KA(data))), applying (KS) thereto to result in (KA(data)), obtaining (KA) and applying same to (KA(data)) to result in the data.

26. The method of claim 25 comprising the application requesting (KA(data))) by way of an existing file system associated with the computing device and an established 'secure read' command thereof.

27. The method of claim 26 comprising the application identifying by way of the secure read command the object and a destination location for (KA(data)), the method further comprising the file system sending a request to the storage medium to locate the identified object, the storage medium reading (KA(data)) from the secure storage area associated with the identified object.

28. A method for an application on a computing device to write data to a storage medium associated with the computing device, the data to be written to a secure storage area associated with an object on the storage medium, the secure storage area having a value storage area on the storage medium associated therewith, the method comprising:

the application generating a nonce and sending a request with the nonce and an identification of the secure storage area;

the storage medium receiving the nonce and the identification of the secure storage area, locating the value storage area associated with the secure storage area, and storing such nonce in the located value storage area;

the application employing the nonce to generate a key (KR), protecting the data with (KH) to result in (KH(data)), and sending same to the storage medium for storage thereon in the secure storage area;

whereby (KH(data)) is associated with the nonce in the value storage area.

29. The method of claim 28 comprising the application sending the nonce by way of a secure communications channel.

30. The method of claim 28 comprising the application combining the nonce and a data key (KA) in a predetermined manner and executing a one-way hash over the combination to result in the key (KH).

31. The method of claim 28 comprising the application sending the nonce to the storage medium by way of an existing file system associated with the computing device and an established 'value write' command thereof.

32. The method of claim 28 comprising the storage medium locating the value storage area associated with the secure storage area based on a look-up table.

33. The method of claim 28 wherein the secure storage area comprises at least one file stored on at least one sector on the storage medium, and wherein the sector includes a sector header on the storage medium, the method comprising the storage medium locating the value storage area associated with the secure storage area as the sector header of the sector of the file of the secure storage area.

34. The method of claim 28 wherein locating the value storage area associated with the secure storage area comprises the storage medium determining that the secure storage area has not as yet been created on the storage medium and one of creating a dummy representation of the secure storage area as a placeholder and caching the nonce until the secure storage area is created.

35. The method of claim 28 further comprising reading the stored data by:

the application sending a request with an identification of the secure storage area;

the storage medium receiving the identification of the secure storage area, locating the value storage area associated with the object, retrieving the nonce from the value storage area, and returning same to the application;

the application employing the nonce to generate the key (KH), retrieving (KH(data)) from the secure storage area on the storage medium, and applying the key (KH) to (KH(data)) to result in the data.

36. The method of claim 35 comprising the application requesting the nonce by way of an existing file system associated with the computing device and an established 'value read' command thereof.

37. The method of claim 28 further comprising terminating use of the data in the secure storage area by replacing the nonce in the value storage area with a different value.

38. A method for an application on a computing device to read data from a storage medium associated with the computing device, the data on the storage medium in a secure storage area associated with an object on the storage medium, the secure storage area having a value storage area on the storage medium associated therewith, the storage medium storing a nonce in the value storage area, the nonce being employed to generate a key (KH), the data being protected with (KH) to result in (KH(data)) and stored in the secure storage area as such (KH(data)) such that (KH(data)) in the secure storage area is associated with the nonce in the value storage area, the method comprising:

the application sending a request with an identification of the secure storage area;

the storage medium receiving the identification of the secure storage area, locating the value storage area associated with the object, retrieving the nonce from the value storage area, and returning same to the application;

the application employing the nonce to generate the key (KH), retrieving (KH(data)) from the secure storage area on the storage medium, and applying the key (KH) to (KH(data)) to result in the data.

39. The method of claim 38 comprising the storage medium returning the nonce by way of a secure communications channel.

40. The method of claim 38 comprising the application requesting the nonce by way of an existing file system associated with the computing device and an established 'value read' command thereof.

41. A computer-readable storage medium comprising computer-executable instructions for an application on a computing device to write data to a first storage medium associated with the computing device, the data to be written to a secure storage area associated with an object on the first storage medium, the computer-executable instructions comprising instructions for:

the application and the first storage medium establishing a session key (KS) as a shared secret;

the application selecting a data key (KA) and protecting the data therewith to result in (KA(data));

the application encrypting (KA(data)) with the session key (KS) to result in (KS(KA(data))) and sending same to the first storage medium;

the first storage medium receiving (KS(KA(data))) and decrypting same with (KS) to result in (KA(data)), locating the secure storage area associated with the object, and storing such (KA(data)) in the located secure storage area.

42. The computer-readable storage medium of claim 41 further comprising instructions for the application sending (KS(KA(data))) to the first storage medium by way of an existing file system associated with the computing device and an established 'secure write' command thereof.

43. The computer-readable storage medium of claim 42 further comprising instructions for the application identifying by way of the secure write command a location from which (KS(KA(data))) may be found and the object associated with or to be associated with the secure storage area that is to receive such (KS(KA(data))); and the file system locating (KS(KA(data))) and sending a request to the first storage medium with (KS(KA(data))) and the identification of the associated object, and the first storage medium writing (KA(data)) to the secure storage area associated with the identified object.

44. The computer-readable storage medium of claim 41 wherein the object comprises at least one file stored on at least one sector on the first storage medium, and wherein the sector includes a sector header on the storage medium, the computer-readable medium further comprising instructions for the first storage medium locating the secure storage area associated with the object as the sector header of the sector of the file of the object.

45. The computer-readable storage medium of claim 41 wherein the instructions for locating the secure storage area associated with the object comprise instructions for the first storage medium determining that the object has not as yet been created on the first storage medium and one of creating a dummy representation of the object as a placeholder and caching (KA(data)) until the object is created.

46. The computer-readable storage medium of claim 41, wherein the instructions for reading the stored data comprise instructions for:

the application and the first storage medium establishing a session key (KS) as a shared secret;

the application requesting (KA(data)) from the secure storage area associated with the object;

the first storage medium retrieving (KA(data)) from the secure storage area, encrypting (KA(data)) with (KS) to result in (KS(KA(data))), and returning (KS(KA(data)));

the application receiving (KS(KA(data))), applying (KS) thereto to result in (KA(data)), obtaining (KA) and applying same to (KA(data)) to result in the data.

47. The computer-readable storage medium of claim 46 further comprising instructions for the application requesting (KA(data)) by way of an existing file system associated with the computing device and an established 'secure read' command thereof.

48. The computer-readable storage medium of claim 47 further comprising instructions for the application identifying by way of the secure read command the object and a destination location for (KA(data)), and the file system sending a request to the first storage medium to locate the identified object, the first storage medium reading (KA(data)) from the secure storage area associated with the identified object.

49. The computer-readable storage medium of claim 41 further comprising instructions for the application selecting a data key (KA) and encrypting the data therewith to result in (KA(data)).

50. A computer-readable storage medium comprising computer-executable instructions for an application on a computing device to write data to a first storage medium associated with the computing device, the data to be written to a secure storage area associated with an object on the first storage medium, the secure storage area having a value storage area on the storage medium associated therewith, the computer-executable instructions comprising instructions for:

the application and the first storage medium establishing a session key (KS) as a shared secret;

the application generating a nonce and employing the session key (KS) to encrypt the nonce to result in (KS(nonce));

the application sending (KS(nonce)) to the first storage medium;

the first storage medium receiving (KS(nonce)) and decrypting same with (KS) to result in the nonce, locating the value storage area associated with the secure storage area, and storing such nonce in the located value storage area;

the application employing the nonce to generate a key (KH), protecting the data with (KH) to result in (KH(data)), and sending same to the first storage medium for storage thereon in the secure storage area;

whereby (KH(data)) is associated with the nonce in the value storage area.

51. The computer-readable storage medium of claim 50 further comprising instructions for the application combining the nonce and a data key (KA) in a predetermined manner and executing a one-way hash over the combination to result in the key (KH).

52. The computer-readable storage medium of claim 50 further comprising instructions for the application sending (KS(nonce)) to the first storage medium by way of an existing file system associated with the computing device and an established 'value write' command thereof.

53. The computer-readable storage medium of claim 52 further comprising instructions for the application identifying by way of the value write command a location from which (KS(nonce)) may be found and the secure storage area associated with or to be associated with the value storage area that is to receive such (KS(nonce)), and the file system locating (KS(nonce)) and sending a request to the first storage medium with (KS(nonce)), the identification of the associated secure storage area, and the first storage medium writing the nonce to the value storage area associated with the identified secure storage area.

54. The computer-readable storage medium storage of claim 50 wherein the secure storage area comprises at least one file stored on at least one sector on the first storage medium, and wherein the sector includes a sector header on the first storage medium, the computer-readable medium further comprising instructions for the first storage medium locating the value storage area associated with the secure storage area as the sector header of the sector of the file of the secure storage area.

55. The computer-readable storage medium of claim 50 wherein instructions for locating the value storage area associated with the secure storage area comprise instructions for the first storage medium determining that the secure storage area has not as yet been created on the first storage medium and one of creating a dummy representation of the secure storage area as a placeholder and caching the nonce until the secure storage area is created.

56. The computer-readable storage medium of claim 50 wherein the instructions for reading the stored data comprise instructions for:

the application and the first storage medium establishing a session key (KS) as a shared secret;

the application requesting the nonce from the value storage area associated with the secure storage area;

the first storage medium retrieving the nonce from the value storage area, encrypting the nonce with (KS) to result in (KS(nonce)), and returning (KS(nonce));

the application receiving (KS(nonce)) and applying (KS) thereto to result in the nonce;

the application employing the nonce to generate the key (KH), retrieving (KH(data)) from the secure storage area on the first storage medium, and applying the key (KH) to decrypt (KH(data)) to result in the data.

57. The computer-readable storage medium of claim 56 further comprising instructions for the application requesting the nonce by way of an existing file system associated with the computing device and an established 'value read' command thereof.

58. The computer-readable storage medium of claim 57 further comprising instructions for the application identifying by way of the value read command the secure storage area and a destination location for the nonce; and the file system sending a request to the first storage medium to locate the identified secure storage area, the first storage medium reading the nonce from the value storage area associated with the identified secure storage area.

59. The computer-readable storage medium of claim 50 further comprising instructions for terminating use of the data in the secure storage area by replacing the nonce in the value storage area with a different value.

60. A computer-readable storage medium comprising computer-executable instructions for an application on a computing device to read data from a first storage medium associated with the computing device, the data on the first storage medium in a secure storage area associated with an object on the first storage medium, the secure storage area having a value storage area on the first storage medium associated therewith, the first storage medium storing a nonce in the value storage area, the nonce being employed to generate a key (KR), the data being protected with (KR) to result in (KH(data)) and stored in the secure storage area as such (KH(data)) such that (KH(data)) in the secure storage area is associated with the nonce in the value storage area, the computer-executable instructions comprising instructions for:

the application and the first storage medium establishing a session key (KS) as a shared secret;

the application requesting the nonce from the value storage area associated with the secure storage area;

the first storage medium retrieving the nonce from the value storage area, encrypting the nonce with (KS) to result in (KS(nonce)), and returning (KS(nonce));

the application receiving (KS(nonce)) and applying (KS) thereto to result in the nonce;

the application employing the nonce to generate the key (KH), retrieving (KH(data)) from the secure storage area on the first storage medium, and applying the key (KH) to decrypt (KH(data)) to result in the data.

61. The computer-readable storage medium of claim 60 further comprising instructions for the application requesting the nonce by way of an existing file system associated with the computing device and an established 'value read' command thereof.

62. The computer-readable storage medium of claim 61 further comprising the application identifying by way of the value read command the secure storage area and a destination location for the nonce; and the file system sending a request to the first storage medium to locate the identified secure storage area, the first storage medium reading the nonce from the value storage area associated with the identified secure storage area.

63. A computer-readable storage medium comprising computer-executable instructions for an application on a computing device to read data from a first storage medium associated with the computing device, the data on the first storage medium in a secure storage area associated with an object on the first storage medium, the data in the secure storage area being protected with (KA) to result in (KA(data)) and stored in the secure storage area as such (KA(data)) such that (KA(data) in the secure storage area is associated with the object, the computer-executable instructions comprising instructions for:

the application and the first storage medium establishing a session key (KS) as a shared secret;

the application requesting (KA(data)) from the secure storage area associated with the object;

the first storage medium retrieving (KA(data)) from the secure storage area, encrypting (KA(data)) with (KS) to result in (KS(KA(data))), and returning (KS(KA (data)));

the application receiving (KS(KA(data))), applying (KS) thereto to result in (KA(data)), obtaining (KA) and applying same to (KA(data)) to result in the data.

64. The computer-readable storage medium of claim 63 further comprising instructions for the application requesting (KA(data))) by way of an existing file system associated with the computing device and an established 'secure read' command thereof.

65. The computer-readable storage medium of claim 64 further comprising instructions for the application identifying by way of the secure read command the object and a destination location for (KA(data)); and the file system sending a request to the first storage medium to locate the identified object, the first storage medium reading (KA(data)) from the secure storage area associated with the identified object.

66. A computer-readable storage medium comprising computer-executable instructions for an application on a computing device to write data to a first storage medium associated with the computing device, the data to be written to a secure storage area associated with an object on the first storage medium, the secure storage area having a value storage area on the first storage medium associated therewith, the computer-executable instructions comprising instructions for:

the application generating a nonce and sending a request with the nonce and an identification of the secure storage area;

the first storage medium receiving the nonce and the identification of the secure storage area, locating the value storage area associated with the secure storage area, and storing such nonce in the located value storage area;

the application employing the nonce to generate a key (KH), protecting the data with (KH) to result in (KH (data)), and sending same to the first storage medium for storage thereon in the secure storage area;

whereby (KH(data)) is associated with the nonce in the value storage area.

67. The computer-readable storage medium of claim 66 further comprising instructions for the application combining the nonce and a data key (KA) in a predetermined manner and executing a one-way hash over the combination to result in the key (KH).

68. The computer-readable storage medium of claim 66 further comprising instructions for the application sending the nonce to the first storage medium by way of an existing file system associated with the computing device and an established 'value write' command thereof.

69. The computer-readable storage medium of claim 66 wherein the secure storage area comprises at least one file stored on at least one sector on the first storage medium, and wherein the sector includes a sector header on the first storage medium, further comprising instructions for the storage medium locating the value storage area associated with the secure storage area as the sector header of the sector of the file of the secure storage area.

70. The computer-readable storage medium of claim 66 wherein instructions for locating the value storage area associated with the secure storage area comprise instructions for the first storage medium determining that the secure storage area has not as yet been created on the first storage medium and one of creating a dummy representation of the secure storage area as a placeholder and caching the nonce until the secure storage area is created.

71. The computer-readable storage medium of claim 66 further comprising instructions for reading the stored data by:
the application sending a request with an identification of the secure storage area;
the first storage medium receiving the identification of the secure storage area, locating the value storage area associated with the object, retrieving the nonce from the value storage area, and returning same to the application;
the application employing the nonce to generate the key (KH), retrieving (KH(data)) from the secure storage area on the storage medium, and applying the key (KH) to (KH(data)) to result in the data.

72. The computer-readable storage medium of claim 71 further comprising instructions for the application requesting the nonce by way of an existing file system associated with the computing device and an established 'value read' command thereof.

73. The computer-readable storage medium of claim 66 further comprising instructions for terminating use of the data in the secure storage area by replacing the nonce in the value storage area with a different value.

74. A computer-readable storage medium comprising computer-executable instructions for an application on a computing device to read data from a first storage medium associated with the computing device, the data on the first storage medium in a secure storage area associated with an object on the first storage medium, the secure storage area having a value storage area on the first storage medium associated therewith, the first storage medium storing a nonce in the value storage area, the nonce being employed to generate a key (KH), the data being protected with (KH) to result in (KH(data)) and stored in the secure storage area as such (KH(data)) such that (KH(data)) in the secure storage area is associated with the nonce in the value storage area, the computer-executable instructions comprising instructions for:
the application sending a request with an identification of the secure storage area;
the first storage medium receiving the identification of the secure storage area, locating the value storage area associated with the object, retrieving the nonce from the value storage area, and returning same to the application;
the application employing the nonce to generate the key (KH), retrieving (KH(data)) from the secure storage area on the first storage medium, and applying the key (KH) to (KH(data)) to result in the data.

75. The computer-readable storage medium of claim 74 further comprising instructions for the first storage medium returning the nonce by way of a secure communications channel.

76. The computer-readable storage medium of claim 74 further comprising instructions for the application requesting the nonce by way of an existing file system associated with the computing device and an established 'value read' command thereof.

77. A system for secure data storage, the system comprising:
a storage medium; and
a computing device configured by an application to perform the steps of:
writing data to the storage medium, the storage medium being associated with the computing device, and the data being written to a secure storage area associated with an object on the storage medium,
establishing a session key (KS) as a shared secret,
selecting a data key (KA) and protecting the data therewith to result in (KA(data)), and
encrypting (KA(data)) with the session key (KS) to result in (KS(KA(data))) and sending same to the storage medium,
wherein the storage medium is configured to receive (KS(KA(data))) and decrypt same with (KS) to result in (KA(data)), locate the secure storage area associated with the object, and store such (KA(data)) in the located secure storage area.

78. The system of claim 77 wherein the application further configures the computing device to send (KS(KA(data))) to the storage medium by way of an existing file system associated with the computing device and an established 'secure write' command thereof.

79. The system of claim 78 wherein the application further configures the computer device to identify by way of the secure write command a location from which (KS(KA(data))) may be found and the object associated with or to be associated with the secure storage area that is to receive such (KS(KA(data))), the file system configured to locate (KS(KA(data))) and send a request to the storage medium with (KS(KA(data))) and the identification of the associated object, and the storage medium further configured to write (KA(data)) to the secure storage area associated with the identified object.

80. The system of claim 77 wherein the object comprises at least one file stored on at least one sector on the storage medium, wherein the sector includes a sector header on the storage medium, and wherein the storage medium is further configured to locate the secure storage area associated with the object as the sector header of the sector of the file of the object.

81. The system of claim 77 wherein the storage medium is configured to locate the secure storage area associated with the object by determining that the object has not as yet been created on the storage medium and one of creating a dummy representation of the object as a placeholder and caching (KA(data)) until the object is created.

82. The system of claim 77 wherein the application further configures the computing device to read the stored data by:

establishing a session key (KS) with the storage medium as a shared secret;

requesting (KA(data)) from the secure storage area associated with the object, wherein the storage medium retrieves (KA(data)) from the secure storage area, encrypts (KA(data)) with (KS) to result in (KS(KA(data))), and returns (KS(KA(data))); and receiving (KS(KA(data))), applying (KS) thereto to result in (KA(data)), obtaining (KA), and applying same to (KA(data)) to result in the data.

83. The system of claim 82 wherein the application further configures the computing device to request (KA(data))) by way of an existing file system associated with the computing device and an established 'secure read' command thereof.

84. The system of claim 83 wherein the application further configures the computing device to identify by way of the secure read command the object and a destination location for (KA(data)), wherein the file system is further configured to send a request to the storage medium to locate the identified object, and wherein the storage medium is further configured to read (KA(data)) from the secure storage area associated with the identified object.

85. The system of claim 77 wherein the application further configures the computing device to select a data key (KA) and encrypt the data therewith to result in (KA(data)).

86. A system for secure data storage, the system comprising:

a storage medium; and a computing device configured by an application to perform the steps of:

writing data to the storage medium, the storage medium being associated with the computing device, writing the data to a secure storage area associated with an object on the storage medium, the secure storage area having a value storage area on the storage medium associated therewith, establishing a session key (KS) as a shared secret with the storage medium, generating a nonce and employ the session key (KS) to encrypt the nonce to result in (KS(nonce)), sending (KS(nonce)) to the storage medium, and employing the nonce to generate a key (KH), to protect the data with (KH) to result in (KH(data)), and to send same to the storage medium for storage thereon in the secure storage area, whereby (KH(data)) is associated with the nonce in the value storage area, wherein the storage medium is configured to receive (KS(nonce)) and decrypt same with (KS) to result in the nonce, to locate the value storage area associated with the secure storage area, and to store such nonce in the located value storage area.

87. The system of claim 56 wherein the application further configures the computing device to combine the nonce and a data key (KA) in a predetermined manner and to execute a one-way hash over the combination to result in the key (KH).

88. The system of claim 86 wherein the application further configures the computing device to send (KS(nonce)) to the storage medium by way of an existing file system associated with the computing device and an established 'value write' command thereof.

89. The system of claim 88 wherein the application further configures the computing device to identify by way of the value write command a location from which (KS(nonce)) may be found and the secure storage area associated with or to be associated with the value storage area that is to receive such (KS(nonce)), the file system is configured to locate (KS(nonce)) and to send a request to the storage medium with (KS(nonce)) and the identification of the associated secure storage area, and the storage medium is further configured to write the nonce to the value storage area associated with the identified secure storage area.

90. The system of claim 86 wherein the secure storage area comprises at least one file stored on at least one sector on the storage medium, wherein the sector includes a sector header on the storage medium, and wherein the storage medium is further configured to locate the value storage area associated with the secure storage area as the sector header of the sector of the file of the secure storage area.

91. The method of claim 86 wherein the storage medium is further configured to locate the value storage area associated with the secure storage area by determining that the secure storage area has not as yet been created on the storage medium and one of creating a dummy representation of the secure storage area as a placeholder and caching the nonce until the secure storage area is created.

92. The system of claim 86 wherein the application further configures the computing device to read the stored data by:

establishing a session key (KS) as a shared secret with the storage medium;

requesting the nonce from the value storage area associated with the secure storage area, wherein the storage medium retrieves the nonce from the value storage area, encrypts the nonce with (KS) to result in (KS(nonce)), and returns (KS(nonce));

receiving (KS(nonce)) and applying (KS) thereto to result in the nonce; and employing the nonce to generate the key (KR), retrieving (KH(data)) from the secure storage area on the storage medium, and applying the key (KH) to decrypt (KH(data)) to result in the data.

93. The system of claim 92 wherein the application further configures the computing device to request the nonce by way of an existing file system associated with the computing device and an established 'value read' command thereof.

94. The system of claim 93 wherein the application further configures the computing device to identify by way of the value read command the secure storage area and a destination location for the nonce, the file system being further configured to send a request to the storage medium to locate the identified secure storage area, and the storage medium being further configured to read the nonce from the value storage area associated with the identified secure storage area.

95. The system of claim 86 wherein the storage medium is further configured to terminate use of the data in the secure storage area by replacing the nonce in the value storage area with a different value.

96. A system for secure data access, the system comprising:

a storage medium configured to store a nonce in a value storage area, the nonce being employed to generate a key (KH), data being protected with (KR) to result in (KH(data)) and being stored in a secure storage area as such (KH(data)) such that (KH(data)) in the secure storage area is associated with the nonce in the value storage area, the storage medium being further configured to retrieve the nonce from the value storage area and to encrypt the nonce with (KS) to result in (KS(nonce)), and returning (KS(nonce)); and a computing device configured by an application to perform the steps of:

reading data from the storage medium, the storage medium being associated with the computing device, the data on the storage medium being stored in the secure storage area associated with an object on the storage medium, the secure storage area having the value storage area on the storage medium associated therewith, establishing a session key (KS) as a shared secret with the storage medium, requesting a nonce from a value storage area associated with the secure storage area, receiving (KS(nonce)) and applying (KS) thereto to result in the nonce, and employing the nonce to generate the key (KH), retrieve (KH(data)) from the secure storage area on the storage medium, and apply the key (KH) to decrypt (KH(data)) to result in the data.

97. The system of claim 96 wherein the application further configures the computing device to request the nonce by way of an existing file system associated with the computing device and an established 'value read' command thereof.

98. The system of claim 97 wherein the application further configures the computing device to identify by way of the value read command the secure storage area and a destination location for the nonce, the file system being further configured to send a request to the storage medium to locate the identified secure storage area, and the storage medium being further configured to read the nonce from the value storage area associated with the identified secure storage area.

99. A system for secure data access, the system comprising:

a storage medium; and a computing device configured by an application to perform the steps of:

reading data from the storage medium, the storage medium being associated with the computing device, the data on the storage medium being stored in a secure storage area associated with an object on the storage medium, the data in the secure storage area being protected with (KA) to result in (KA(data)) and stored in the secure storage area as such (KA(data)) such that (KA(data) in the secure storage area is associated with the object, establishing a session key (KS) as a shared secret with the storage medium, requesting (KA(data)) from the secure storage area associated with the object, and receiving (KS(KA(data))), applying (KS) thereto to result in (KA(data)), and obtaining (KA) and applying same to (KA(data)) to result in the data, wherein the storage medium is configured to retrieve (KA(data)) from the secure storage area, encrypt (KA(data)) with (KS) to result in (KS(KA(data))), and return (KS(KA(data))).

100. The system of claim 99 wherein the application further configures the computing device to request (KA(data))) by way of an existing file system associated with the computing device and an established 'secure read' command thereof.

101. The system of claim 100 wherein the application further configures the computing device to identify by way of the secure read command the object and a destination location for (KA(data)), the file system being further configured to send a request to the storage medium to locate the identified object, and the storage medium being further configured to read (KA(data)) from the secure storage area associated with the identified object.

102. A system for secure data storage, the system comprising:

a storage medium; and a computing device configured by an application to perform the steps of:

writing data to the storage medium, the storage medium being associated with the computing device, the data to be written to a secure storage area associated with an object on the storage medium, the secure storage area having a value storage area on the storage medium associated therewith, generating a nonce and sending a request with the nonce and an identification of the secure storage area, receiving the nonce and the identification of the secure storage area, locating the value storage area associated with the secure storage area, and storing such nonce in the located value storage area, and employing the nonce to generate a key (KH), to protect the data with (KH) to result in (KH(data)), and to send same to the storage medium for storage thereon in the secure storage area, whereby (KH(data)) is associated with the nonce in the value storage area.

103. The system of claim 102 wherein the application further configures the computing device to combine the nonce and a data key (KA) in a predetermined manner and execute a one-way hash over the combination to result in the key (KH).

104. The system of claim 102 wherein the application further configures the computing device to send the nonce to the storage medium by way of an existing file system associated with the computing device and an established 'value write' command thereof.

105. The system of claim 102 wherein the secure storage area comprises at least one file stored on at least one sector on the storage medium, wherein the sector includes a sector header on the storage medium, the wherein the storage medium is further configured to locate the value storage area associated with the secure storage area as the sector header of the sector of the file of the secure storage area.

106. The system of claim 102 wherein the storage medium is configured to locate the value storage area associated with the secure storage area by determining that the secure storage area has not as yet been created on the storage medium and one of creating a dummy representation of the secure storage area as a placeholder and caching the nonce until the secure storage area is created.

107. The system of claim 102 wherein the application further configures the computing device to read the stored data by:

sending a request with an identification of the secure storage area, wherein the storage medium receives the identification of the secure storage area, locates the value storage area associated with the object, retrieves the nonce from the value storage area, and returns same to the application; and employing the nonce to generate the key (KH), retrieving (KH(data)) from the secure storage area on the storage medium, and applying the key (KH) to (KH(data)) to result in the data.

108. The system of claim 107 wherein the application further configures the computing device to request the nonce by way of an existing file system associated with the computing device and an established 'value read' command thereof.

109. The system of claim 102 wherein the storage medium is further configured to terminate use of the data in the secure storage area by replacing the nonce in the value storage area with a different value.

110. A system for secure data access, the system comprising:

a storage medium configured to store a nonce in a value storage area, the nonce being employed to generate a key (KH), data being protected with (KH) to result in (KH (data)) and stored in a secure storage area as such (KH (data)) such that (KH(data)) in the secure storage area is associated with the nonce in the value storage area; and a computing device configured by an application to perform the steps of:

reading data from the storage medium, the storage medium being associated with the computing device, the data being stored on the storage medium in a secure storage area associated with an object on the storage medium, the secure storage area having a value storage area on the storage medium associated therewith, and sending a request with an identification of the secure storage area, employing the nonce to generate the key (KH), retrieve (KH(data)) from the secure storage area on the storage medium, wherein the storage medium is further configured to receive the identification of the secure storage area, locate the value storage area associated with the object, retrieve the nonce from the value storage area, and return same to the application.

111. The system of claim 110 wherein the storage medium is further configured to return the nonce by way of a secure communications channel.

112. The system of claim 110 wherein the application further configures the computing device to request the nonce by way of an existing file system associated with the computing device and an established 'value read' command thereof.

* * * * *